United States Patent [19]

Taka

[11] Patent Number: 5,416,560
[45] Date of Patent: May 16, 1995

[54] CAMERA

[75] Inventor: Hideo Taka, Tokyo, Japan

[73] Assignee: Canon Kabushiki Kaisha, Tokyo, Japan

[21] Appl. No.: 282,225

[22] Filed: Jul. 29, 1994

Related U.S. Application Data

[60] Continuation of Ser. No. 912,823, Jul. 13, 1992, abandoned, which is a division of Ser. No. 789,425, Nov. 4, 1991, Pat. No. 5,162,833, which is a continuation of Ser. No. 446,387, Dec. 5, 1989, abandoned, which is a continuation of Ser. No. 227,824, Aug. 3, 1988, abandoned.

[30] Foreign Application Priority Data

| Aug. 7, 1987 | [JP] | Japan | 62-198762 |
| Aug. 7, 1987 | [JP] | Japan | 62-198763 |
| Aug. 7, 1987 | [JP] | Japan | 62-198764 |
| Aug. 7, 1987 | [JP] | Japan | 62-198765 |
| Aug. 7, 1987 | [JP] | Japan | 62-198766 |
| Aug. 7, 1987 | [JP] | Japan | 62-198767 |

[51] Int. Cl.6 .......... G03B 5/00; G03B 17/00; H04N 5/232

[52] U.S. Cl. .............. 354/471; 354/195.1; 348/64; 348/220; 348/231; 348/358

[58] Field of Search ............... 354/471, 289.1, 289.12, 354/195.1, 195.12; 348/64, 220, 231, 233, 358

[56] References Cited

U.S. PATENT DOCUMENTS

| 4,456,931 | 6/1984 | Toyoda et al. | 358/906 X |
| 4,532,558 | 7/1985 | Oota et al. | 358/906 X |
| 4,837,628 | 6/1989 | Sasaki | 358/209 |
| 4,858,028 | 8/1989 | Okino | 358/909 X |

Primary Examiner—W. B. Perkey
Attorney, Agent, or Firm—Robin, Blecker, Daley & Driscoll

[57] ABSTRACT

The present patent application discloses improvements in the camera having an image memory for storing still image information, such that when a still image is displayed on a monitor, actuation of a camera release is ignored; when meaningless still images of the image memory are prevented from appearing on the monitor; and further good manageability of the camera is assured when writing and reading the image information in and from the image memory.

8 Claims, 21 Drawing Sheets

| STATUS | FUNCTIONS | RE (READ) | WE (WRITE) | COUNTER DISPLAY |
|---|---|---|---|---|
| ST 0 | IDLE CONDITION | | | FC |
| ST 1 | MOVING IMAGE DISPLAY; SUCCESSIVE RENEWAL | MM | MM | FC |
| ST 2 | CAMERA RELEASE IN PROGRESS; SHUTTER OPENED | | | FC |
| ST 3 | STILL IMAGE DISPLAY AFTER CAMERA RELEASE; STILL IMAGE STORED IN RECALL MEMORY | MM | M(i) | FC |
| ST 4 | WINDING OR REWINDING IN PROGRESS | | | FC |
| ST 5 | SELECTION OF REWRITTEN IMAGE OF SPECIAL MEMORY | M'(j) | | |
| ST 6 | IMAGE REPRODUCTION FROM RECALL MEMORY | M(i) | | F(i) RCL |
| ST 7 | DISPLAY OF RECALL MEMORY DOWN (DOWN) | M(i) | | F(i) RCL |
| ST 8 | DISPLAY OF RECALL MEMORY UP (UP) | M(i) | | F(i) RCL |
| ST 9 | CONTENT OF RECALL MEMORY → STORED IN SPECIAL MEMORY | M(i) | M'(j) | |
| ST 10 | IMAGE REPRODUCTION FROM SPECIAL MEMORY | M'(j) | | |
| ST 11 | DOWN DISPLAY OF SPECIAL MEMORY (DOWN) | M'(j) | | |
| ST 12 | UP DISPLAY OF SPECIAL MEMORY (UP) | M'(j) | | |
| ST 13 | OBJECT IMAGE (MOVING IMEGE) → STILL IMAGE DISPLAY (NOT WRITTEN IN RECALL MEMORY) | MM | | FC |
| ST 14 | OBJECT IMAGE (STILL IMAGE DISPLAY) → WRITTEN IN SPECIAL MEMORY AT THE TIME OF RELEASE FROM DEPRESSION OF SPECIAL BUTTON | MM | M'(j) | |
| ST 15 | STILL IMAGE → TO SPECIAL MEMORY | M(i) | M'(j) | |

FIG.4

| M(i)/FC | 1 | 2 | 3 | 4 | ... | 23 | 24 | 25 | 26 | 27 | 28 | ... | 34 | 35 | 36 | 37/0 | 0 | 0 |
|---|---|---|---|---|---|---|---|---|---|---|---|---|---|---|---|---|---|---|
| M(1) |  | 1 | 1 | 1 | ... | 1 | 1 | 1 | 25 | 25 | 25 | ... | 25 | 25 | 25 | 25 | 25 | 25 |
| M(2) |  |  | 2 | 2 | ... | 2 | 2 | 2 | 2 | 26 | 26 | ... | 26 | 26 | 26 | 26 | 26 | 26 |
| M(3) |  |  |  | 3 | ... | 3 | 3 | 3 | 3 | 3 | 27 | ... | 27 | 27 | 27 | 27 | 27 | 27 |
| M(4) |  |  |  |  | ... | 4 | 4 | 4 | 4 | 4 | 4 | ... | 28 | 28 | 28 | 28 | 28 | 28 |
| M(5) |  |  |  |  | ... | 5 | 5 | 5 | 5 | 5 | 5 | ... | 29 | 29 | 29 | 29 | 29 | 29 |
| M(6) |  |  |  |  | ... | 6 | 6 | 6 | 6 | 6 | 6 | ... | 30 | 30 | 30 | 30 | 30 | 30 |
| M(7) |  |  |  |  | ... | 7 | 7 | 7 | 7 | 7 | 7 | ... | 31 | 31 | 31 | 31 | 31 | 31 |
| M(8) |  |  |  |  | ... | 8 | 8 | 8 | 8 | 8 | 8 | ... | 32 | 32 | 32 | 32 | 32 | 32 |
| M(9) |  |  |  |  | ... | 9 | 9 | 9 | 9 | 9 | 9 | ... | 33 | 33 | 33 | 33 | 33 | 33 |
| M(10) |  |  |  |  | ... | 10 | 10 | 10 | 10 | 10 | 10 | ... | 10 | 34 | 34 | 34 | 34 | 34 |
| M(11) |  |  |  |  | ... | 11 | 11 | 11 | 11 | 11 | 11 | ... | 11 | 11 | 35 | 35 | 35 | 35 |
| M(12) |  |  |  |  | ... | 12 | 12 | 12 | 12 | 12 | 12 | ... | 12 | 12 | 12 | 36 | 36 | 36 |
| M(13) |  |  |  |  | ... | 13 | 13 | 13 | 13 | 13 | 13 | ... | 13 | 13 | 13 | 13 | 0 | 0 |
| M(14) |  |  |  |  | ... | 14 | 14 | 14 | 14 | 14 | 14 | ... | 14 | 14 | 14 | 14 | 14 | 0 |
| M(15) |  |  |  |  | ... | 15 | 15 | 15 | 15 | 15 | 15 | ... | 15 | 15 | 15 | 15 | 15 | 15 |
| M(16) |  |  |  |  | ... | 16 | 16 | 16 | 16 | 16 | 16 | ... | 16 | 16 | 16 | 16 | 16 | 16 |
| M(17) |  |  |  |  | ... | 17 | 17 | 17 | 17 | 17 | 17 | ... | 17 | 17 | 17 | 17 | 17 | 17 |
| M(18) |  |  |  |  | ... | 18 | 18 | 18 | 18 | 18 | 18 | ... | 18 | 18 | 18 | 18 | 18 | 18 |
| M(19) |  |  |  |  | ... | 19 | 19 | 19 | 19 | 19 | 19 | ... | 19 | 19 | 19 | 19 | 19 | 19 |
| M(20) |  |  |  |  | ... | 20 | 20 | 20 | 20 | 20 | 20 | ... | 20 | 20 | 20 | 20 | 20 | 20 |
| M(21) |  |  |  |  | ... | 21 | 21 | 21 | 21 | 21 | 21 | ... | 21 | 21 | 21 | 21 | 21 | 21 |
| M(22) |  |  |  |  | ... | 22 | 22 | 22 | 22 | 22 | 22 | ... | 22 | 22 | 22 | 22 | 22 | 22 |
| M(23) |  |  |  |  | ... |  | 23 | 23 | 23 | 23 | 23 | ... | 23 | 23 | 23 | 23 | 23 | 23 |
| M(24) |  |  |  |  | ... |  |  | 24 | 24 | 24 | 24 | ... | 24 | 24 | 24 | 24 | 24 | 24 |

FIG.21

CAMERA

This is a continuation application under 37 CFR 1.62 of prior application Ser. No. 07/912,823, filed Jul. 13, 1992, abandoned, which is a divisional of Ser. No. 789,425, filed Nov. 4, 1991 U.S. Pat. No. 5,162,833, which is a continuation of Ser. No. 446,387 filed Dec. 5, 1989, abandoned, is a continuation of Ser. No. 227,824 filed Aug. 3, 1988, abandoned.

BACKGROUND OF THE INVENTION

1. Field of the Invention

This invention relates to a camera having an image memory for storing still image information.

2. Description of the Related Art

Techniques of introducing the image memory into the photographic camera have already been known. Yet, some unfavorable results have occured as follows.

For example, Japanese Laid-Open Patent Application No. Sho 62-9289 discloses a camera of this kind in which, to shoot an object on action by the solid state image pickup element, its moving image is displayed on a monitor. When a shutter switch is pushed down a still image is stored in a semiconductor memory. And, what picture has been taken and stored can be reviewed by reproduction on the monitor.

However, such a conventional camera had a drawback in that, if the shutter switch or release button was pushed at a time during the display of the preceding still image, because the next frame of an object to be shot was not monitored, the photographer failed to choose his desired target area. This would result also in a disadvantage of putting unnecessary still images into the memory.

Also in the conventional camera of this kind each time a shot was taken, it was at a consecutive address to the last used one in the image memory that its still image information was stored. To read the image information out of the image memory, a similar way was adopted in the address sequencing. Hence, no particular measure was taken for control on the address sequencing in reading after the address for the "oldest" (or "newest") shot image has been reached.

As a result, when reading the memory reproduction circulated from the "oldest" shot abruptly to the "newest" one, or vice versa. Thus, the order in which the images had been shot became uncertain.

Further, the use of such a control by successive increments or decrements of all the addresses in reading the image information from the image memory led to allow even those storage areas which were not yet used for shooting to be accessed. Thus, still another drawback was seen in that the blank frames of no meaning were displayed.

It is also known to provide a conventional camera of this kind constructed by inserting a half mirror into the photographic optical system for the silver halide camera. The object image bearing beam is split off by the half mirror into two parts, one of which is directed to the solid state image pickup element. Hence, the same object image is recorded not only on the photographic film but on a semiconductor memory or like image memory device. And, after the recording is complete, the still image in the memory can be reproduced on the display. Yet, even after the camera is reloaded with new film, those still images which were recorded along with the old roll of film eventually find their reproduction on display. Therefore, this camera had a problem that it became uncertain that the reproduced image in question might be assigned to which of the old and new rolls of film.

Another example of the conventional camera of this kind is disclosed in Japanese Laid-Open Patent Application No. Sho 57-78281, where when the release button is half pushed down for the first time, a moving image is displayed; when half pushed down for the second time, a still image is displayed; when half pushed down, the image memory gives off a stored image on the display; as long as an access button is pushed down, all the stored images in the memory are successively displayed; and when the release button is fully pushed down, the stored image under display is replaced by a new one. Since selection of the modes thus relied on recycling of depression of the release button to the half stroke, after the release button had once been pushed to the half stroke, the preceding viewed image continued being displayed until the button was further pushed to the full stroke, whereby much electrical energy was consumed. Another problem was that what mode is selectively set by how many times the release button has been pushed to the half stroke was very difficult for the user to foresee.

Also, in the conventional camera of this kind, for control of the zoom ratio of the motorized zoom lens, there is a wide-angle/telephoto selection switch dedicated solely to this purpose. Meanwhile, apart from this, another selection switch was provided for reading the information of one of the exposed images out of the image memory to display it. Hence the manual actuators on the camera housing became many in number. This involved errors in manipulation and eroded good manageability. Even for the designer, it provided layout difficulty.

SUMMARY OF THE INVENTION

A first second object of the invention is to provide a camera which operates in reading of information of what shots have been taken from the image memory in such a manner that the order of the shots is preserved so as not to become uncertain to the photographer.

To achieve such an object, according to the invention, the camera having an image memory of capacity to store a plurality of shot still image frames is provided with address control means provided for controlling the addressing operation so that the effective address for the image to be read out of the memory is incremented or decremented in subsequent passes, and read control means responsive to coincidence of the address to be read to the one for the newest or oldest shot image information for later prohibiting that address from being incremented or decremented.

By this feature, when reading the image memory, the addresses of the images are not circulated so automatically that the Dead newest image is followed by the oldest one to be read, or vice versa, thereby making clear in what order the images under reproduction were taken.

A second object of the invention is to provide a camera which allows only the shot image information to be read out of the image memory.

To achieve such an object, according to the invention, the camera having an image memory capable of storing &till image information for a plurality of shot frames is provided with read control means for prohibiting the one or ones of a plurality of storage areas in the image memory not yet recorded with still image information from being read.

In this feature, concerning the image memory, the value of that address which stores the latest shot image is memorized so that the ones of the storage areas which are not yet recorded are hindered from being accessed.

These and other objects and features of the invention will become apparent from the following description of an embodiment thereof.

BRIEF DESCRIPTION OF THE DRAWINGS

FIG. 4 is a table for the conditions corresponding to the status words of FIG. 3 under which the memory acts in read and write modes along with the display therefor.

FIG. 21 is a table for the relationship between the frame counter and the recall memory.

DETAILED DESCRIPTION OF THE PREFERRED EMBODIMENT

The invention is next described in greater detail in connection with an embodiment thereof.

Figure 1:
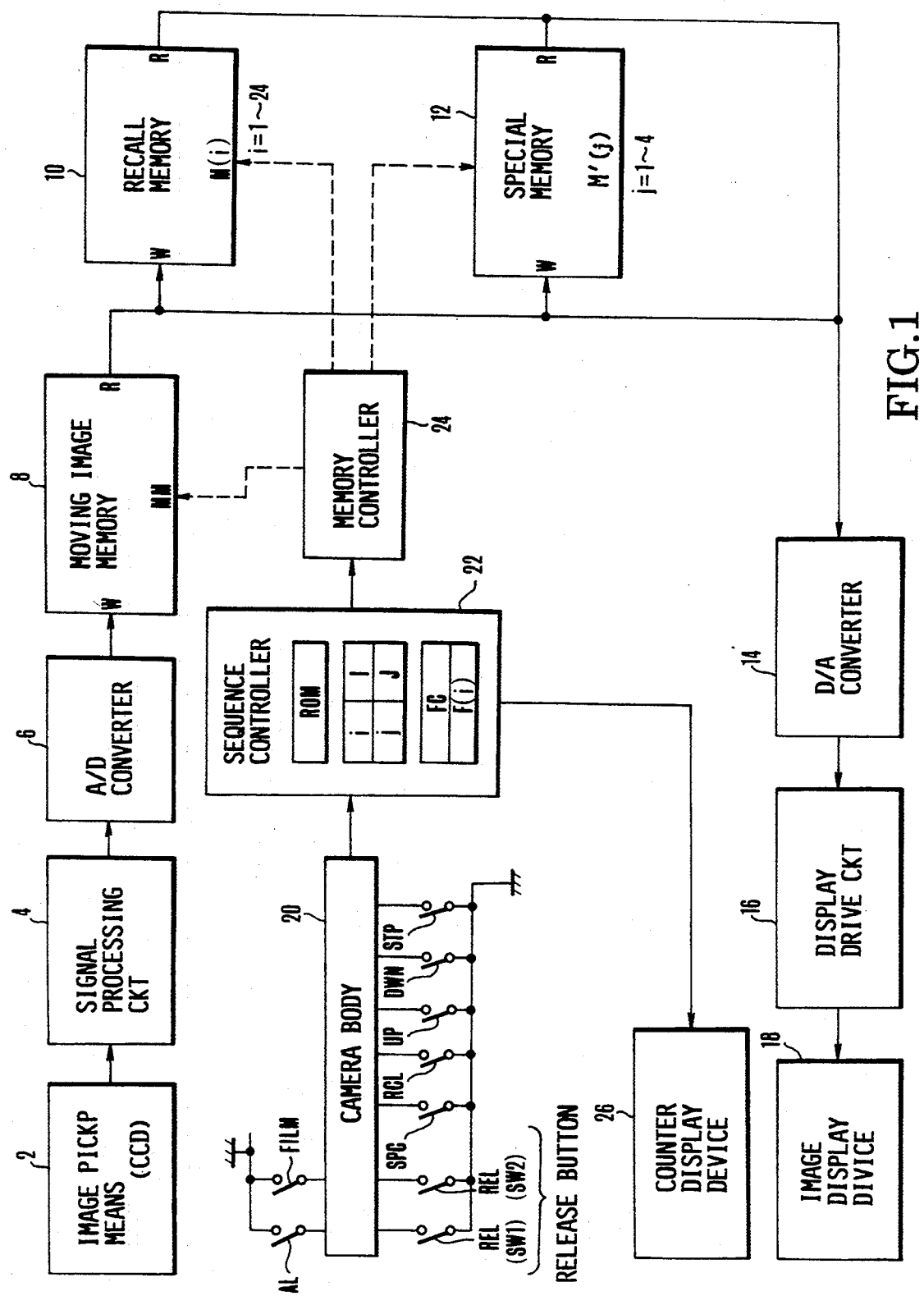
FIG. 1 is a block diagram illustrating the entirety of an embodiment of a camera according to the invention.

FIG. 1 shows in block diagram the arrangement of all devices of a practical example of the still camera equipped with an electronic imaging device, to which the invention is applied. The outer appearance of this camera is partly shown in FIG. 2.

In these two figures, image pickup means 2 including a CCD (charge coupled device) receives an equivalent image of the same object to that formed on photographic film by a motor driven zoom lens 30.

A signal processing circuit 4 treats an image signal obtained from the CCD to match a certain signal level and a signal form.

An A/D (analog-to-digital) converter 6 produces a digital signal for one picture plane (one frame or one field) in each predetermined clock period.

A moving image memory 8 has a storage capacity of one picture plane. The image data produced from the A/D converter 6 are written in the memory 8 in response to a clock of a predetermined period. In the following description, the content of the moving image memory 8 will be given by an expression "MM".

A recall memory 10 has a storage capacity of 24 picture planes. The expression of the content of the recall memory 10 is generalized by "M(i)". That is, the recall memory 10 can store, in correspondence to its addresses i=1 to i=24, the data of 1st to 24th picture planes, or M(1) to M(24) respectively.

A special memory 12 has a storage capacity of four picture planes. The expression of the content of the special memory 12 is generalized by "M'(j)". In correspondence to its addresses j=1 to 4, the image data M'(1)-M'(4) are stored respectively.

A D/A converter 14 receives the data of one image plane read out of either one of the moving image, recall and special memories 8, 10 and 12 and produces a corresponding analog signal.

display drive circuit 16 receives the analog output from the D/A converter 14 and converts it to a signal for driving an image display device 18.

The image display device 18 comprises a 2dimensional array of liquid crystal display elements (LCDs) and can display an image in one picture plane. Therefore, when the write-and-read operation of the moving image memory 8 is being recycled, the image on the CCD is transferred to be displayed on the device 18. But when the information of that image is prohibited from being written in the memory 8, (that is, when the writing is frozen,) the memory 8 provides the data of a still image. Hence, the image display device 18 presents a stationary display of that image. Likewise, the image data in the recall memory 10 or the special memory 12 when being read provides only a still image on the display.

Figure 2:
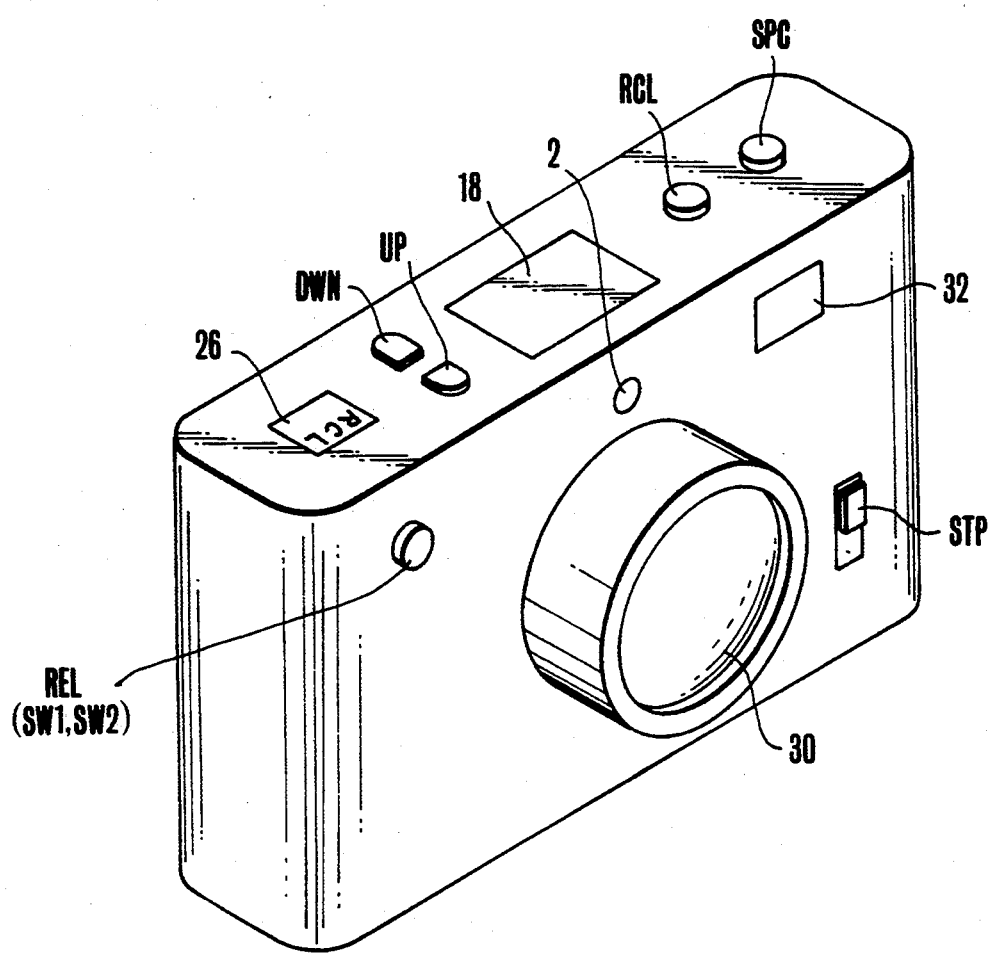
FIG. 2 is a perspective view of the camera of FIG. 1 with the arrangements of control buttons on the housing thereof.

A camera body 20 whose outer appearance is shown in FIG. 2 has the motor driven zoom lens 30 associated with a photographic optical system (not shown) for film exposure, and is provided with many control buttons and switches as follows:

(i) A release button REL:

This button is used for driving the optical system to make an exposure. When pushed down to a first stroke, it closes a first switch SW1. Upon further depression to a second stroke, a second switch SW2 is closed.

(ii) A special button SPC:

In each of the cases: (a) when the release button REL is not pushed down; (b) when the first switch SW1 is closed; and (c) when the second switch SW2 is closed, by pushing down the special button SPC, writing in the special memory 12, or reading with display from the memory 12 is carried out. This is more fully described later.

(iii) A recall button RCL:

Similarly to the special button SPC, depending on the pushed state of the release button REL, this button gives write/read commands to the recall memory 10.

(iv) An up button UP:

Each time this button is pushed down, the effective address i or j of the recall or special memory 10 or 12 is incremented by 1 in a range of i=1 to 24, or j=1 to 4. After i=24 has been reached, when the up button UP is once more pushed down, i=0 results. With a stop switch STP to be described later in ON state, however, this depression of the up button UP is ignored. (See FIG. 12)

Likewise, the address of the special memory 12 can transit from j=4 to j=1 in response to depression of the up button UP.

This up button UP also serves as a switch for zooming the lens 30 toward the telephoto end, when the image display device 18 operates in the moving image display mode.

(v) A down button DWN:

Each time this button is pushed down, the address i or j of the recall or special memory 10 or 12 is decremented by 1 in the range of i=1 to 24, or j=1 to 4. After i=1, another depression of the down button DWN results in i=24, provided the stop switch STP is in OFF state. (See FIG. 11)

Likewise, after j=1, another depression of the down button DWN results in j=4.

This down button DWN also serves as a Wide Angle switch for the zoom lens 30 when in the moving image display mode.

(vi) A stop switch STP:

When images stored in the recall memory 10 which is selected to operate by pushing the recall button RCL are successively presented on the image display device 18 by recycling the depression of the up button UP or down button DWN, the rolling of the displayed image is either permitted or prohibited, depending on the switched position of this stop switch STP as a mode selector. Its details will be described in connection with FIGS. 11 and 12.

(vii) A switch AL:

This switch is mounted on the inside of a back cover (not shown) of the camera body 20. When a new film cartridge is loaded into the camera body 20, the switch AL produces an output signal representing such loading, as will be more fully described later in connection with FIG. 5.

Figure 5:
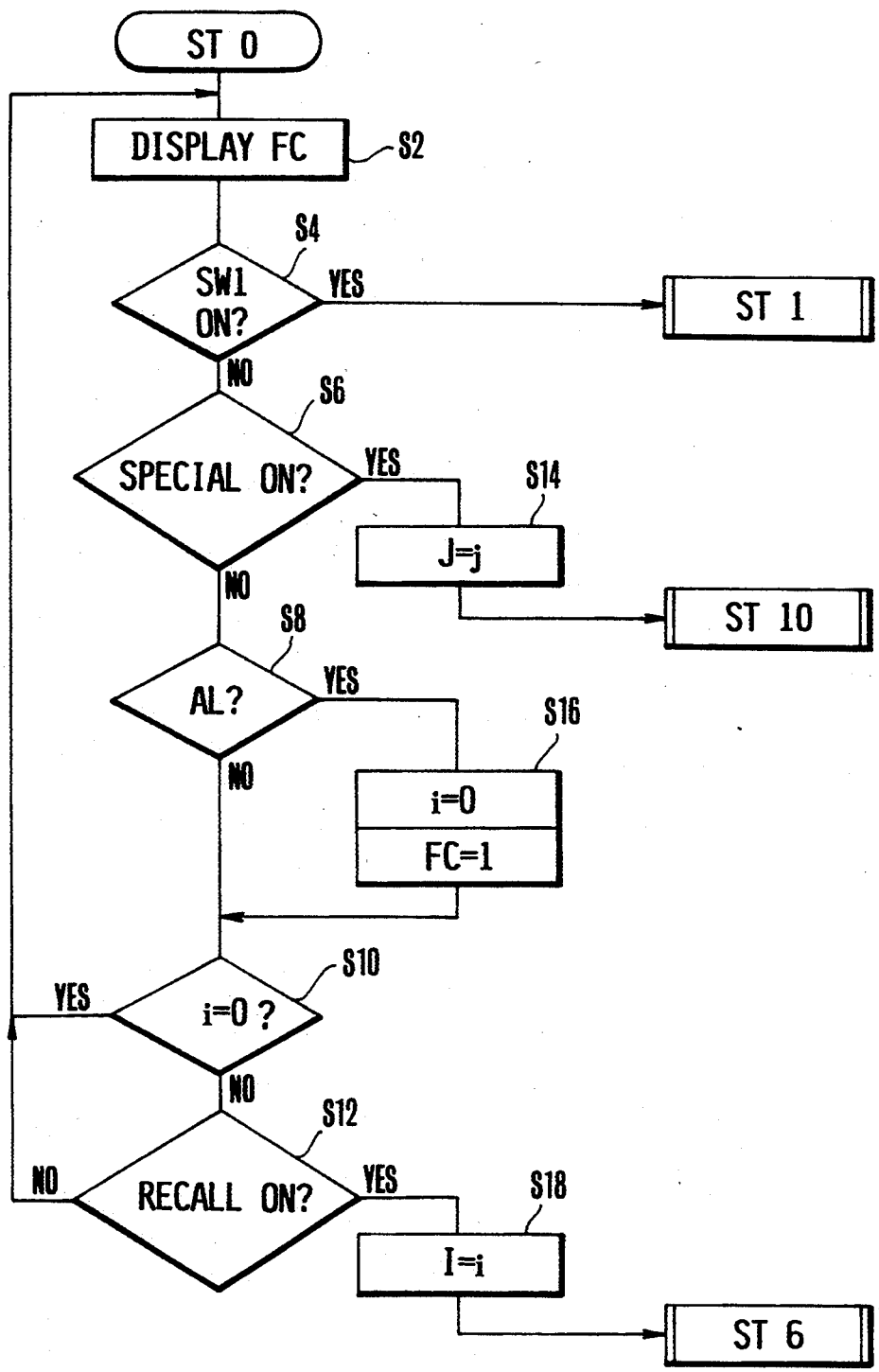
FIGS. 5 to 20 are flowcharts illustrating in great detail the device actions that reset the status bits.

(viii) A switch FILM:

This is a switch for detecting whether or not the auto-loading of silver halide film is complete, or whether or not any more fresh film frame can be fed to the exposure aperture, as will be more fully described later in connection with FIG. 5.

22 (FIG. 1) is a sequence controller for all the 8 operations of this embodiment. Included in this sequence controller 22 are not only a ROM storing the instructions to be executed (which will be described in detail by reference to FIG. 3 and those that follow,) but also four registers i, j, I, J as a work memory, a frame counter FC for counting the number of exposed frames of silver halide film and another frame counter F(i) for counting the corresponding number of the shot frame to the i-th address of the recall memory 10.

A memory controller 24 (FIG. 1) controls the write-/read operation of the moving image, recall and special memories 8, 10 and 12, as will be totally described by reference to FIG. 4.

A counter display device 26 (FIG. 1) selectively displays the counted values of the frame counters FC and F(i). To make discrimination between them, when displaying the number of frames which the frame counter F(i) has counted, a mark "RCL" appears together with that number, letting the user know that the recall memory 10 operates the frame counter F(i).

Figure 3:
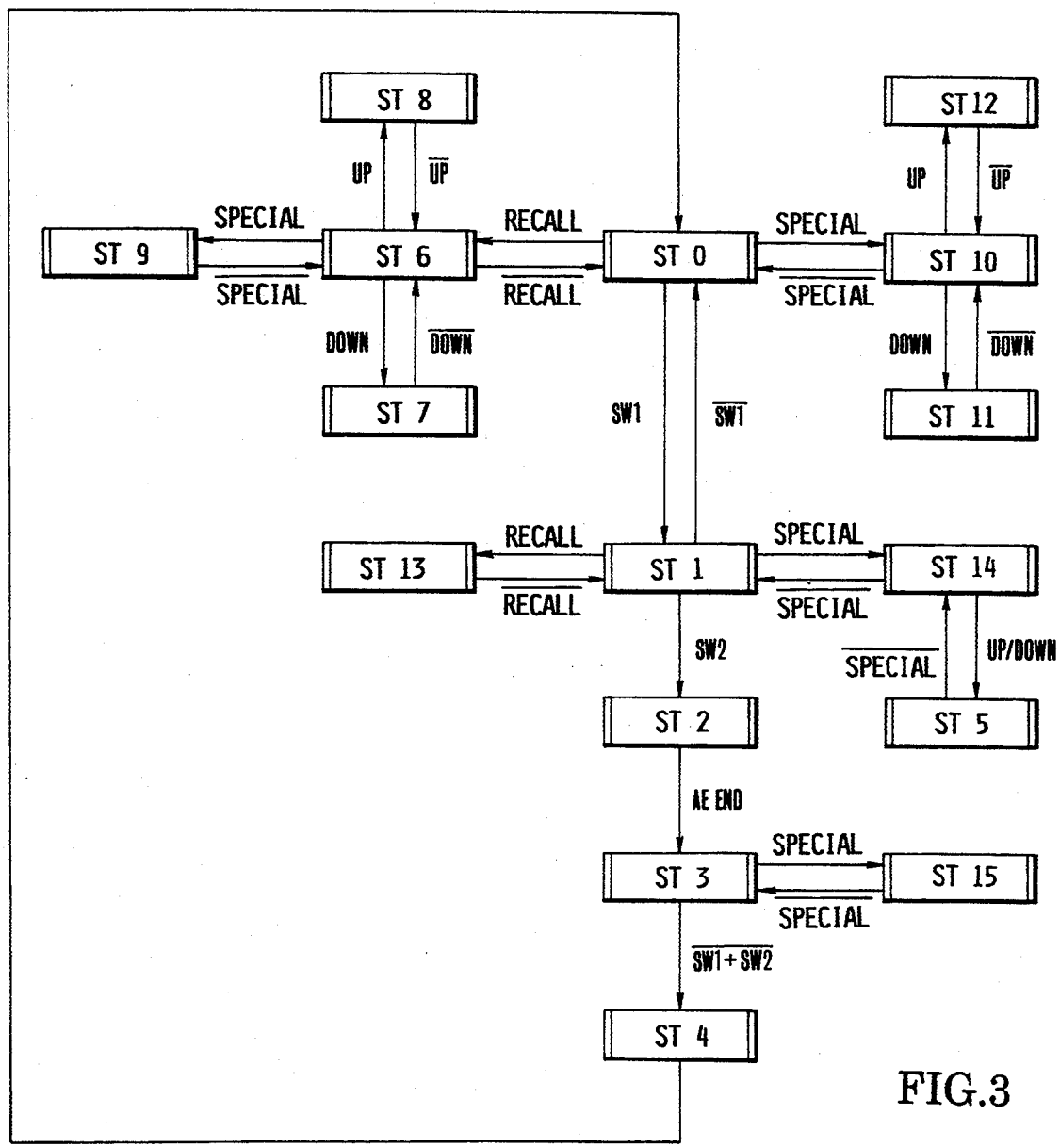
FIG. 3 is a diagram of shift between the status words representing the conditions the operations of the embodiment can take.

FIG. 3 is a diagram of the paths of status shift representing all the changes of the conditions this embodiment can take. In this diagram, "ST" stands for status, and has any word of "0" to "15". A shift labeled "RECALL" occurs when the recall button RCL is depressed; "$\overline{RECALL}$" for the release of the recall button RCL from the depression; "SPECIAL" for depression of the special button SPC; "$\overline{SPECIAL}$" for release of the special button SPC from the depression; "UP" for depression of the up button UP; "$\overline{UP}$" for release of the up button UP from the depression; "DOWN" for depression of the down button DWN; "$\overline{DOWN}$" for release of the down button DWN from the depression; "SW1" for depression of the release button REL to the first stroke; "$\overline{SW1}$" for release of the release button REL from the depression to the first stroke; "SW2" for further depression of the release button REL up to the second stroke; "$\overline{SW1+SW2}$" for release of the release button REL from all the depression; and "AE END" for completion of an exposure.

FIG. 4 lists the functions of the status words ST 0 to ST 15 and what to write in or read from the memories.

In this table, what is to be read from the memory is shown in a column "RE" (for Read Enable), where "MM" means an instruction of reading the stored image data from the moving image memory 8; "M(i)" from the i-th address of the recall memory 10; "M'(j)" from the j-th address of the special memory 12.

Also, what is to be written in the memory is shown in a column "WE" (for Write Enable), where "MM" means an instruction of storing the data of an image picked up by the CCD into the moving image memory 8; "M(i)" an instruction of reading the image data MM from the moving image memory 8 and storing them at the i-th address of the recall memory 10; and "M'(j)" an instruction of reading either the image data MM from the moving image memory 8 or the image data M(i) from the recall memory 10 and storing them into the j-th address of the special memory 12.

Next, by reference to FIGS. 3 and 4, each of the status words ST 0 through ST 15 is briefly described.

At first, for the camera is left idle, in other words, the operator does not yet manipulate any of the portions of the camera, for example, the release button REL, this condition represents a status ST 0 which informs the sequence controller 22 only to display the content of the counter FC representing the silver halide film frame number on the counter display device 26, (see FIG. 1), while the image display device 18 has nothing displayed.

With the camera in this status ST 0, when the special button SPC is pushed down, a shift to a status ST 10 occurs.

The status ST 10 informs the sequence controller 22 to perform reading of the image data M'(j) from the special memory 12 so that a sill image of the j-th address appears on the image display device 18. If, at this time, the up button UP is pushed down, a shift to a status ST 12 occurs.

In the status ST 12, the effective address j of the special memory 12 is incremented, and the corresponding still image to the (j+1)th address is displayed.

If, in the status ST 10, the down button DWN is pushed down, the status shifts to ST 11, whereby the effective address j of the special memory 12 is decremented to display the corresponding still image to the (j−1)th address.

The above-described status ST 10, ST 11 and ST 12, as is apparent from nothing described in "WE" column of FIG. 4 at these rows, the memories do not operate for writing at all.

Returning to the idle condition of the camera, when the recall button RCL is pushed down, the status shifts from ST 0 to ST 6.

The status ST 6 informs the controller 22 to send the content M(i) of the recall memory 10 to the image display device 18. Simultaneously sent to the counter display device 26 is the corresponding number of the shot frame to the address of the recall memory 10 at which the image of that frame was stored in combination with "RCL" indicating that the number is a recall memory number of the recall memory 10. (See FIG. 4)

From this status ST 6, by pushing down the up button UP or down button DWN, shift occurs to a status ST 8 or ST 7 respectively. Thus, the displayed content M(i) of the recall memory 10 can be altered selectively. It should be noted that when the stop switch STP is in ON position, there are occasions of prohibiting rolling of the displayed images.

With the camera left not Shooting, as the content M(i) of the recall memory 10 is displayed at the image display device 18 by the status ST 6, when the special button SPC is pushed down, a shift to a status ST 9 occurs.

In the status ST 9, the image data are read from the i-th address of the recall memory 10, and stored in the j-th address of the special memory 12. Because this does not change the image data to be inputted to the D/A converter 14, the image on the image display device 18 remains unchanged.

Next explanation is given to a case where the release button REL is pushed to the first stroke, whereby the first switch SW1 (see FIG. 1) is closed.

When the first switch SW1 is closed, a status ST 1 occurs informing the controller 22 to repeat the cycle of writing in and reading from the moving image memory 10. Therefore, a moving image formed on the CCD reveals itself on the display 18, while the content of the counter FC, or the film frame number, is shown on the counter display device 26.

If the status ST 1 is combine with depression of the recall button RCL, then a shift to a status ST 13 occurs.

The status ST 13 stops the writing in the moving image memory 8, while permitting only the reading therefrom. Hence, the content of moving image memory 8 is frozen. Thus, the image display device 18 presents a still image that is taken at the time when the recall button RCL is pushed down. In such a way, by pushing down the recall button RCL, it becomes possible to monitor how to conduct shooting. It should be noted here that this status ST 13 the recall memory 13 is not set for writing, allowing such monitoring alone to take place.

If the status ST 1 is otherwise combined with depression of the special button SPC, then a shift to a status ST 14 occurs.

In response to the status ST 14, the memory controller 24 prohibits writing to the moving image memory 8, but permits only reading there from. So, a still image MM obtained by Shooting the moving image at the moment when the special button SPC has been pushed down is displayed at the image display device 18. And, when the special button SPC is released from the depression, the same still image MM as that on the display is brought into storage in the special memory 12. In short, it is under the condition of the status ST 14 that the depression of the special button SPC changes a display from the moving image display mode (status ST 1) to the still image display mode, and the release from the depression effects the result of storing that still image in the special memory 12.

If, in the status ST 14, the up button UP or down button DWN is pushed down for the first time, a shift to a status ST 5 occurs.

Upon shift to the status ST 5, the reading from the special memory 12 is initiated. Thus, the image on the image display device 18 is changed over from a still image MM frozen in the moving image memory 8 to image data M'(j) stored in the special memory 12. When the up button UP or the down button DWN is pushed down for the second time, the next image M'(j+1) or M'(j−1) appears on the image display device 18, and so on. This allows the user to choose an address j in which the above-identified still image MM is to be stored. After the corresponding image to that address j has appeared on the image display device 18, the user can remove his finger from the special button SPC, whereupon the camera returns past the status ST 14 to the status ST 0 (moving image display mode).

When in the status ST 1, further depression of the release button REL to the second stroke closes the second switch SW2, initiating an exposure with a shift to a status ST 2. At the termination of the exposure, a further shift to a status ST 3 occurs.

The status ST 3 informs the memory controller 24 to prohibit writing in the moving image memory 8 to effect freezing and perform reading therefrom. Thereby an object image (still image) is displayed on the image display device 18. Further, writing in the recall memory 10 is carried out. Therefore, the frozen object image is stored in the recall memory 10.

The status ST 3 when combined with depression of the special button SPC shifts to a status ST 15.

In the status ST 15, the recorded image M(i) of the recall memory 10 stored by the status ST 3 is read and stored also in the special memory 12. Hence the same image as the image MM frozen in the status ST 3 is stored in both of the recall memory 10 and the special memory 12.

In the status ST 3, when the depression of the release button REL is fully released, a shift to a status ST 4 occurs, where the film is wound up or rewound. Then the status ST 0 returns.

Referring to FIGS. 5 to 21, each of the above-described status ST 0 through ST 15 is, described in detail below.

ST 0 (Idle condition: FIG. 5)

At first, a step S2 displays the content of the frame counter FC on the counter display device 26. Then, a step S4 tests the first switch SW1 of the release button REL. If on (Yes), then advance is to the status ST 1 for transferring a moving image taken by the image pickup means 2 to the image display device 18. If off (No), then advance is to a step S6.

The step S6 determines whether or not the special button SPC is pushed down to send the j-th still image in the special memory 12 to the image display device 18. If so, then advance is to a step S14 where the value of a register j (which corresponds to the number representing where the last recorded still image lies within the special memory 12) is stored in a register J, thus setting the status ST 10 (for reproduction of the image of the special memory 12). It should be noted here that by making J=j, the operator is enabled to know what is the number of the address in which the latest still image has been recorded when the content of the register J is consulted. Meanwhile, if the special button SPC is determined in the step S6 not to be pushed down, then advance is to a step S8. The step S8 tests the switch AL. This switch AL changes from OFF to ON, only when a silver halide film cartridge is loaded into the camera body 20. If the change from OFF to ON has occurred, then advance is to a step S16 where the register i representing the number of that address of the recall memory 10 which was last used for recording with the preceding film cartridge is set to 0, and at the same time the frame counter FC is set to 1. A step S10 will follow. Before embarking on the step S10, it is to be noted here that by making i=0 at the time of loading the silver halide film cartridge, the recall memory 10 is virtually cleared. Even if the previous still images remain recorded in the recall memory b, these recorded images are regarded as nullities. (That is, they cannot be displayed on the image display device 18.) Since the frame counter FC has been set to 1, the counter display device 26 shows 1 as the frame number when in the step S2 or others. Meanwhile, if the switch AL is determined in the step S8 to remain OFF, as it implies that the camera is not loaded with any silver halide film cartridge, then advance is to the step S10.

The step S10 determines whether or not the register i is 0. If so (that is, the switch AL is OFF), as it implies that the recall memory 12 has virtually been cleared, then return is to the step S2 without having to reproduce the remaining images of the recall memory 10. Meanwhile, if not 0, then advance is to a step S12. (In the case that the register i is not 0, despite the lack of the silver halide film cartridge in the camera body 20, images can be recorded in the recall memory 10 or others.) The step S12 tests the recall button RCL. If it is not pushed down, then return is to the step S2. Otherwise, advance is to a step S18, where the value of the register i is stored in the register I. This will set the status ST 6 for reproduction of the images of the recall memory 10. It is to be noted here that the content of the register i represents what number of that address of the recall memory 10 was used for recording of the latest still image. By means of I=i, regardless of the up/down shift of the effective address for reproduction of the images in the recall memory 10 from the number (i) when in the status ST 6, or ST 13, it is assured that the photographer can later know about the number of that address which was used for recording the latest image in the recall memory 10.

Figure 6:
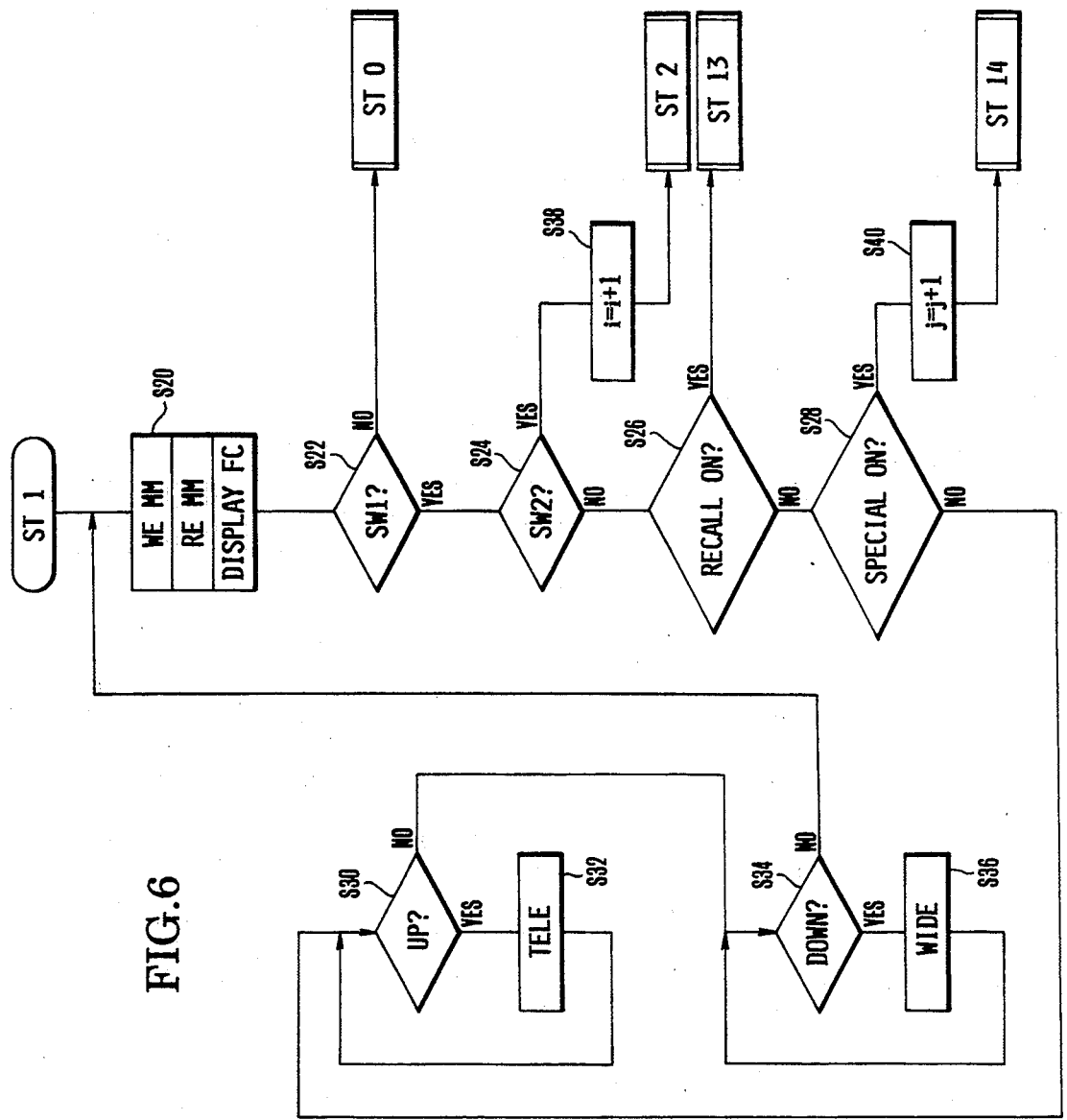

ST 1 (Moving Image display; Successive renewal: FIG. 6)

The procedure of the flowchart of FIG. 6 begins with a start labeled ST 1 which indicates the closure of the first switch SW1 in the step S4 of the flowchart for the status ST 0. At first, a step S20 sends a shot image (moving image) MM from the image pickup means 2 to, and writes it in, the moving image memory 8, and, at the same time, reads the recorded image (moving image) MM within the moving image memory 8 to make a display on the image display device 18, and further at the same time displays the value of the frame counter FC on the counter display device 26. It should be noted that the writing in and reading (displaying) from the moving image memory 8 repeat until a shift to another status.

The next step S22 tests the first switch SW1 of the release button REL. If not ON, then return is to the status ST 0. If ON, then advance is to a step S24 for testing the second switch SW2. If the second switch SW2 is ON, as it implies that the shutter in the camera body 20 has been released, then the register i is incremented by 1 (step S38,) thus setting up the status ST 2 during the releasing of the shutter. Here, making a change from i to i+1, the recall memory 10 is prepared for recording a new still image. Meanwhile, if the second switch SW2 is determined in the step S24 not to be ON, then advance is to a step S26 for testing the recall button RCL. If the recall button RCL is in depression, this sets up the status ST 13 for displaying the still image MM from the moving image memory 8. Otherwise, advance is to a step S28.

The step S28 tests the special button SPC. If in depression, then the register j is incremented by 1 (step S40), thus setting up the status ST 14 for recording the image in motion on the image display device 18 as a still image at that storage area of the special memory 12 which has so far been prepared for re-recording.

Meanwhile, if, in the step S28, the special button SPC is not pushed down, as it implies that the image in motion on the display 18 is not to be recorded in the recall memory 10 and the special memory 12, then advance is to a process for driving the zoom lens 30 of the camera body 20 with selection of the TELE and WIDE. directions. That is, when the up button UP is pushed down, a loop (of Steps: S30→S32) is encountered. So long as it is pushed, the zoom lens 30 is driven to the telephoto side. Instead, depression of the down button DWN encounters another loop (of Steps: S34→S36.) During pushing, the zoom lens 30 is driven toward the wide angle end. If the up button UP and the down button DWN are not pushed down, then return is to the step S20.

Figure 7:
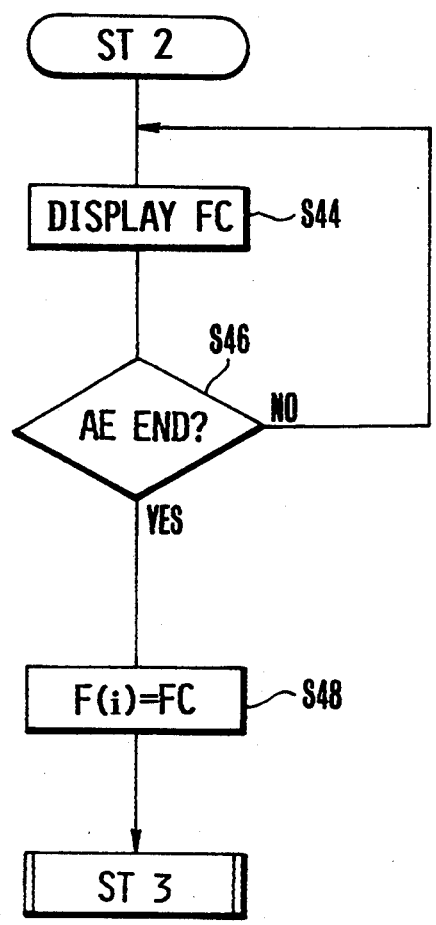

ST 2 (Camera release in progress, Shutter in open state: FIG. 7)

The procedure begins with a start labeled ST 2 which indicates that in the status ST 1 the second switch SW2 turns on (through the step S38). At first, a step S44 displays the content of the frame counter FC on the counter display device 26 (which represents the number of a silver halide film frame which is exposed in progress). The next step S46 waits for a signal AE END representing the end of the release from the camera body 20, upon advent of the signal, the value in the frame counter FC which specifies a record number (i) for the recall memory 10 at which the image in the moving image memory 8 is to be stored, is brought into storage in the recall memory counter F(i), thus setting up the status ST 3 for, after the completion of the exposure, displaying the image taken by now and recording that image in the recall memory 10.

Figure 8:
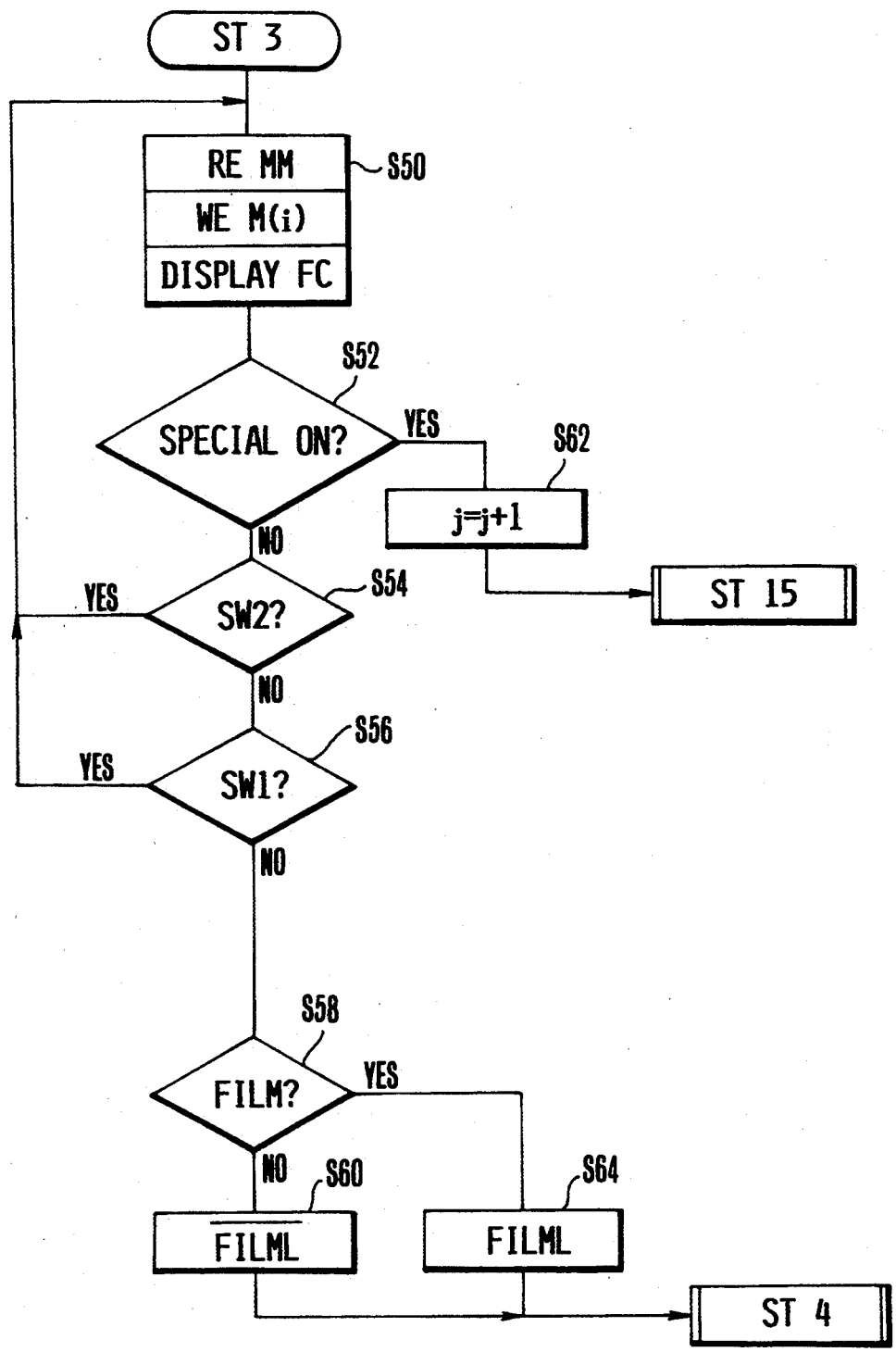

ST 3 (Record a still image in the recall memory 10: FIG. 8)

The procedure starts from the end of the status ST 2. A first step S50 stops writing in the moving image memory 8, while permitting continuity of only the reading from the same memory 8. Therefore, what is to be recorded in the moving image memory 8 is a still image which has been transferred from the images formed on the image pickup means 2 at the moment when the camera release ended. Also, in the step S50, the still image on the moving image memory 8 is transferred to and recorded in the i-th storage area of the recall memory 10. Further, the value of the frame counter FC is displayed on the counter display device 26.

The next step S52 tests the special button SPC. If in depression, then the register j is incremented by 1 (Step S62,) thus setting up the status ST 15 for reading the still image from the moving image memory 8 and recording it in the special memory 12. Here, the change from j to j+1 is made for the purpose of preparing the special memory 12 to record a new image. Meanwhile, if, in the step S52, the special button SPC is determined not to be pushed, then advance is to steps S54 and S56 where the first and second switches SW1 and SW2 of the release button REL are tested. If both switches are ON, as this implies that the status ST 1, ST 2 sequencing still continues because the release button REL remains depressed even after the end of the release of the camera body 20, then the turn-off of both switches SW1 and SW2 is awaited.

If both switches SW1 and SW2 turn off, then the switch FILM to see if another fresh frame is available from the loaded silver halide film is tested in the camera body 20 in a step S58. If ON, then set a flag FILML for use in determining whether or not to advance the frame counter FC (step S64 ) thus set up the status ST 4 for winding up or rewinding. Otherwise, the flag FILML is reset (step S60), and then advance to the status ST 4.

Figure 9:
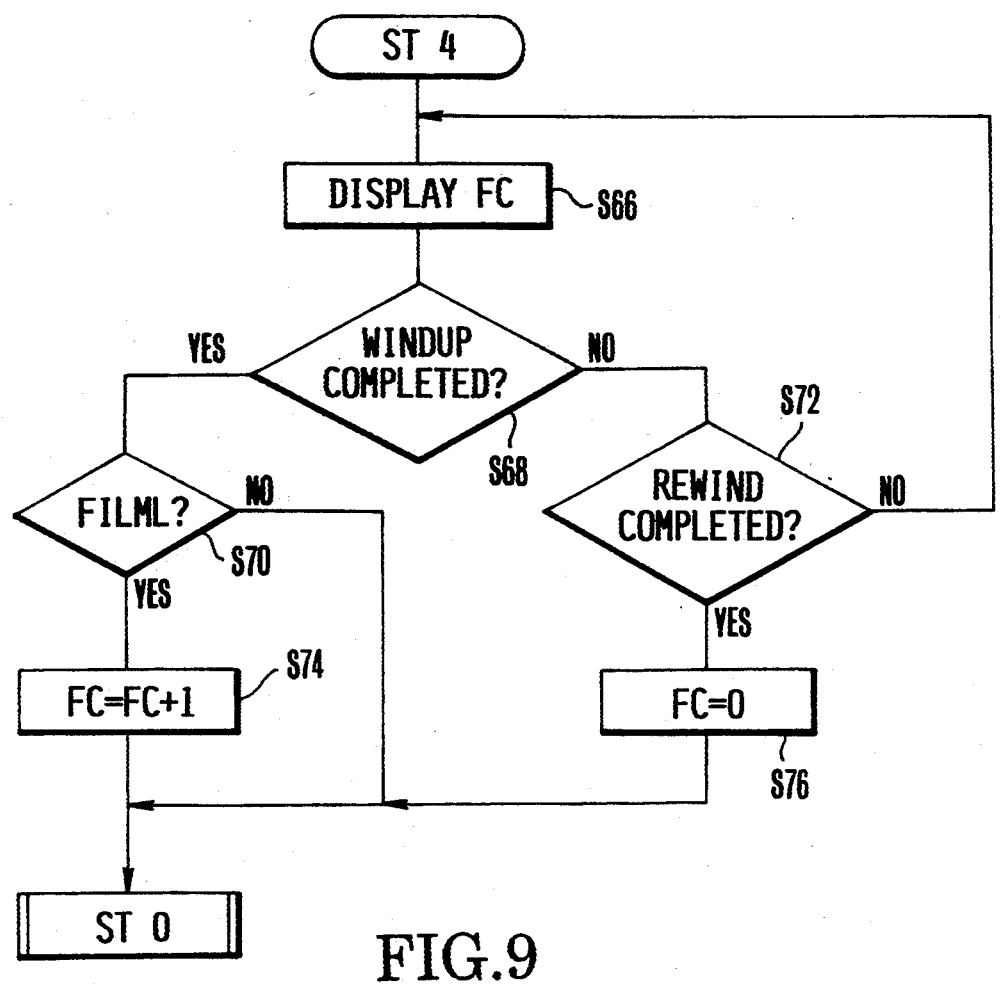

ST 4 (Wind-up; Rewind: FIG. 9)

The procedure starts from the end of the status ST 3. A first step S66 displays the value of the frame counter FC on the counter display device 26. A second step S68 determines whether or not a signal representing the completion of the winding operation has come from the camera body 20. If not, as it implies that the silver halide film in the camera body 20 has all been exposed, then advance is to a step S72 for detecting the completion of a rewinding operation. Otherwise, advance is to a step S70.

The step S72 waits for a signal representing that the rewinding is complete from the camera body 20. Upon advent of the signal, a step S76 is executed to clear the frame counter FC. Then return to the status ST 0. The step S70, on the other hand, tests the flag FILML. If it is set, as this implies that a fresh frame of the silver halide film is set in the exposure aperture of the camera body 20, then a step S74 is executed to increment the frame counter FC by 1. Then return to the status ST 0. If the step S70 detects the resetting of the flag FILML, as this implies that the silver halide film is not set in the camera body 20, then return is to the status ST 0 without any further action.

Figure 10:
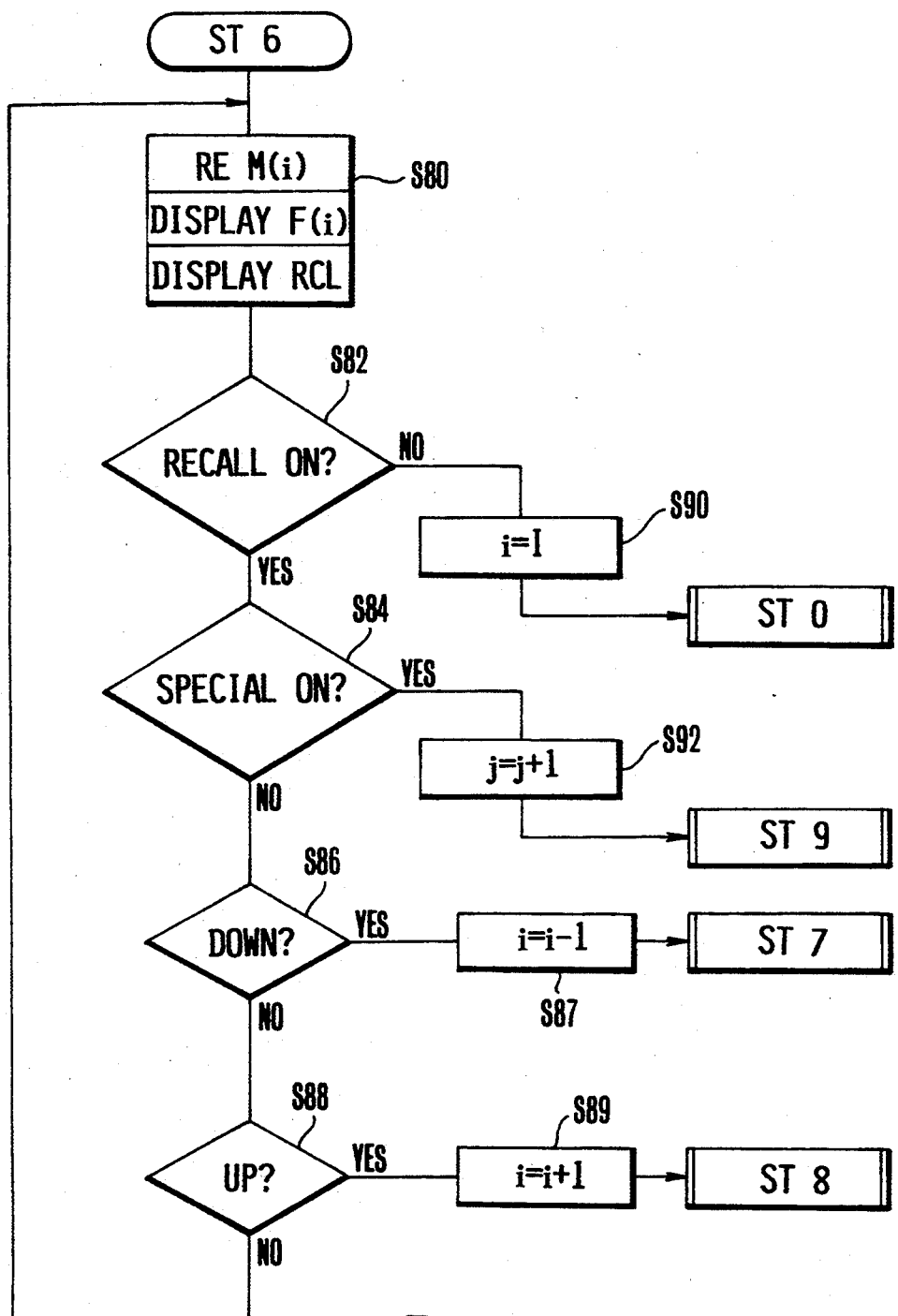

ST 6 (Reproduction of image from the recall memory 10: FIG. 10)

This is to read the i-th still image from the recall memory 10 to make a display on the image display device 18. The start indicates that in the status ST 0 the recall button RCL was pushed down (and the step S18 was executed).

A first step S80 reads the i-th still image M(i) from the recall memory 10 to make a display on the image display device 18, and displays the corresponding number of the shot frame to that address of the recall memory 10 which has recorded the read image, or the value of the frame counter F(i), on the display device 26. Further presented on the counter display device 26 is the mark "RCL" representing that the content of the recall memory 10 is being presented on the image display device 18.

A second step S82 tests the recall button RCL. If not in depression, that is, as photographer has removed his finger from the recall button RCL pushed in the status ST 0, then a step S90 is executed to change the value of the register i back to a value equal to the value of the register I which represents the latest record number of the recall memory 10. Then return is to the status ST 0. If the step S82 detects that the recall button RCL remains pushed down, then advance is to a step S84.

The step S84 tests the special button SPC. If in depression, then the register j is by 1 in a step S92, thus setting up the status ST 9. Here, the change from j to j+1 is made to prepare for recording of a new still image in the special memory 12, since the special button SPC has been pushed down. Otherwise, advance is to a step S86 for testing the down button DWN. If in depression, then the register i is decremented by 1 in a step S87, thus setting up the status ST 7 for displaying the image read from the recall memory 10 in a down mode, (that is, the one of the images in the recall memory 10 which is to be presented on the image display device 18 is selected in the order of progressively smaller numbers of the number i). Otherwise, advance to a step S88.

The step S88 tests the up button UP. If in depression, then the register i is incremented in a step S89, thus setting up the status ST 8 for displaying the images in the recall memory 10 in an up mode, (that is, the one of the images in the recall memory 10 which is to be displayed is selected in the Order of gradually larger numbers of the number i). Otherwise, return is to the step S80.

Figure 11:
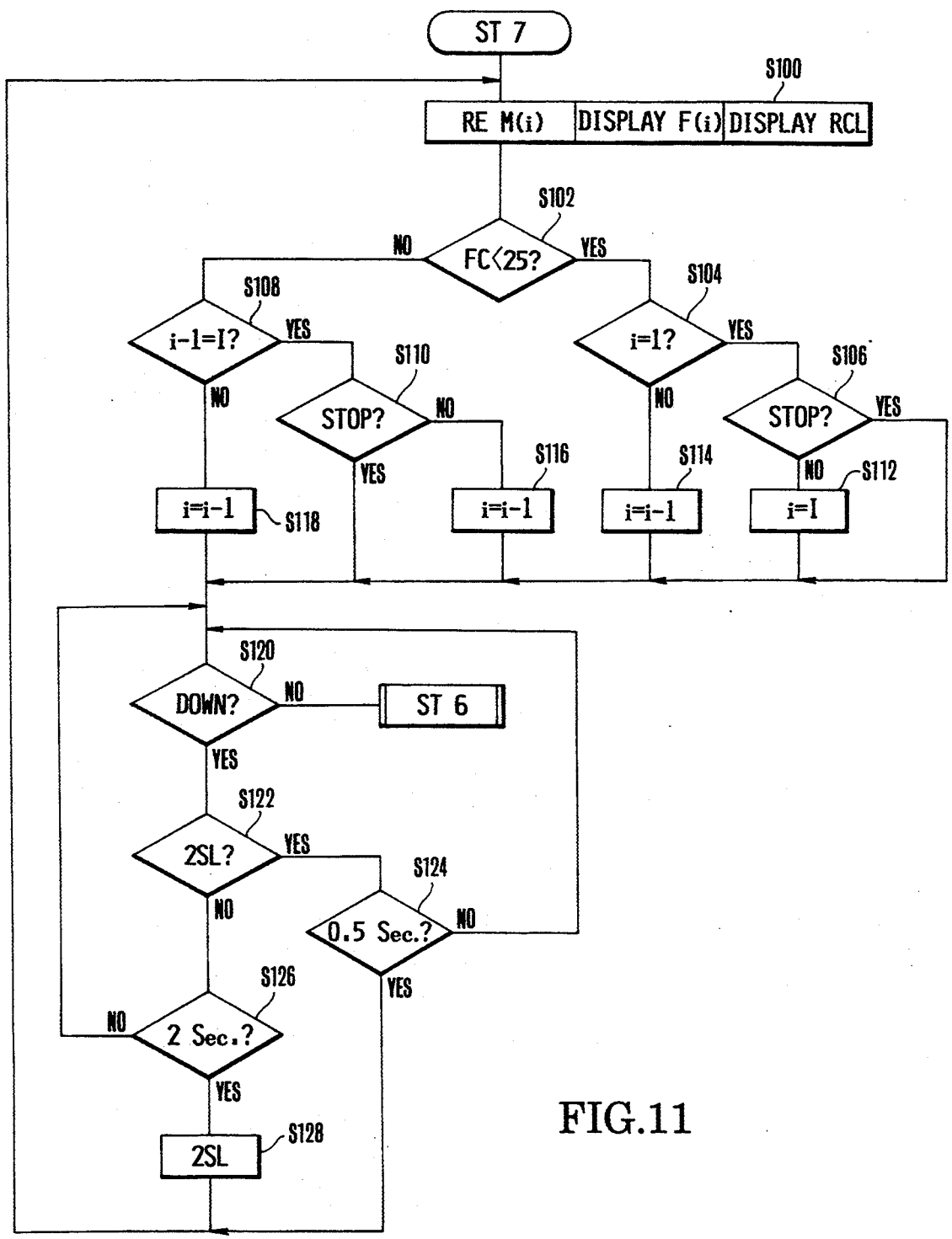

ST 7 (Down display mode for the recall memory 10: FIG. 11)

The procedure begins with a start which indicates that in the status ST 6 the down button DWN has been pushed down. A first step S100 reads the i-th still image M(i) of the recall memory 10 to make a display on the image display device 18, and presents the value of the recall memory counter F(i) and the mark "RCL" to the counter display device 26. A second step S102 examines whether the value of the frame counter FC is less than 25 to see if a larger number of frames of the silver halide film than the record capacity "24" of the recall memory 10 have been exposed.

If the value of the frame counter FC is determined in the step S102 to be less than 25 (or the number of exposed frames of the silver halide film falls within the record capacity of the recall memory 10), then advance is to a step S104 for determining whether the value of the register i is 1. If so, then advance is to a step S106. Otherwise, advance is to a step S114.

The step S106 tests the stop switch STP. If ON, then advance is to a step S120. If OFF, then a step S112 is executed to fetch the value of the register I to the register i (which value represents the number of the that area of the recall memory 10 which was last recorded). Then advance is to a step S120. The step S114 decrements the register i by 1. Then advance is to the step S120.

Meanwhile, if the value of the frame counter FC is determined in the step S102 to be 25 or more (in excess of the record capacity of the recall memory 10, or if the number of exposed frames of the silver halide film is larger the 24), then advance is to a step S108 for examining whether or not the value of the register i minus one is equal to the value of the register I. For example, as a series of continuous releases have been actuated, when the 26th frame of the silver halide film is exposed, the value of the frame counter FC takes a value of 27 and the value of the register I is 2. Suppose the execution of the step S108 results in i−1=I, that is, the down button DWN continues being pushed down for so long a time that the sequencing of presentation of the recorded still images in the recall memory 10 to the image display device 18 (with decreasing values of the number i) reaches a number just before the number (I) of the oldest recorded still image in the recall memory 10. So, advance to a step S110 for testing the stop switch STOP. If ON, then advance directly to the step S120, thus prohibiting presentation of the still images of even smaller record numbers in the recall memory 10 to the image display device 18, (as will be more fully described later). If in the step S110 the stop switch STOP is OFF, the above-described prohibition does not work. Then the register i is decremented by 1 in a step S116. Then advance is to the step S120.

In the step S108, if "i−1" is not equal to I, the number of the recorded still image on the display of the recall memory 10 does not yet reach the number just before the number (I) of the oldest recorded still image in the recall memory 10. Then advance to a step S118 where the register i is decremented by one. Then advance is to the step S120.

The step S120 tests the down button DWN. If not in depression, then return is to the status ST 6. Otherwise, advance is to a step S122. A process comprising the step S122 to a step S128 defines a timing of presentation in the down display mode of the recorded still images in the recall memory 10 to the image display device 18. That is, the step S122 checks whether a flag 2SL is set, since this flag is set at the point in time of elapse of 2 sec. from the start of the status ST 7. If not, then 2 sec. is awaited from the start of the status ST 7 in a step S126. In response to the elapse of 2 sec., the step S128 sets the flag 2SL. Then return is to the step S100. If the flag 2SL is determined in the step S122 to be set, then advance is to the step S124 for waiting for a signal occurring in time spaces of 0.5 sec. from the start of the status ST 7. If it arrives, then return is to the step S100.

The above-described procedure of the status ST 7 is next explained, taking a practical example by reference also to FIG. 21. Assuming that the camera has shot continuous 27 frames of one and the same silver halide film, (in other words, the status ST 0→ST 1→ST 2→ST 3→ST 4→ST 0 sequencing repeats 27 times). At this time, i=3, I=3, FC=28. Then the recall button RCL is pushed down (ST 6), and the down button DWN is pushed down, (the pushing is assumed to continue), starting the status ST 7. At first, the step S100 displays the second recorded still image of the recall memory 10 on the image display device 18. Then advance is to the step S102. Since the check of FC<25 results in "NO", then advance is to the step S108. Since, here, i−1=1 and I=3, then advance is to the step S118 where the register i is set to 1. Then advance is to the step S120. Since the down button DWN continues being pushed, when 2 sec. has passed from the start of the status ST 7, the first step S100 is regained. So, the first recorded still image of the recall memory 10 is presented to the image display device 18. Then the flow passes through the step S102 to the step S108. Since in the step S108, i−1=24 and I=3 are found, the step S118 sets the register i to 24. By now, the steps S120, S122 and S124 are passed before the step S100 is regained. Such a procedure repeats. Again, on the image display device 18, at the time of start of the status ST 7, of the recorded still images of the recall memory 10, the second one (i=2) is presented. At the termination of duration of 2 sec. from the start of the status ST 7, the first one (i=1) is presented. After that, each time 0.5 sec. has passed, the 24th (i=24), the 23rd (i=23), the 22nd (i=22) . . . are displayed in the down mode. And, when i−1=I is established as detected in the step S108, or when i=4 is reached, (at this time, the image display device 18 presents the fourth recorded still image of the recall memory 10: Hence one rotation of all the images of the recall memory 10 is just complete), advance to the step S110 occurs. If the stop switch STP is in ON state, the recorded still images of the recall memory 10 are prohibited from rolling on the display. Then advance is directly to the step S120. After that, the process of the steps S122, S124, S100, S102, S108, S110 and S120 only repeats, while the rolling display is prohibited. If the step S110 detects that the stop switch STP is off, the rolling display is allowed. So, branch to the step S116 is made. After the register i is decremented to i=3, then advance is to the step S120. Thus, the down display mode continues to operate. In the "Yes" case of the check: FC<25 by the step S102, the step S104 follows. The subsequent procedure is for the case that the number of exposed frames of the silver halide film is 24 or below, and is similar in operational principle to that described above. (It should be noted that the condition for the prohibition of the rolling display (S104) is that the record number of the recall memory 10 should be 1, or the earliest shot image). Therefore, a more concrete explanation is omitted here.

Figure 12:
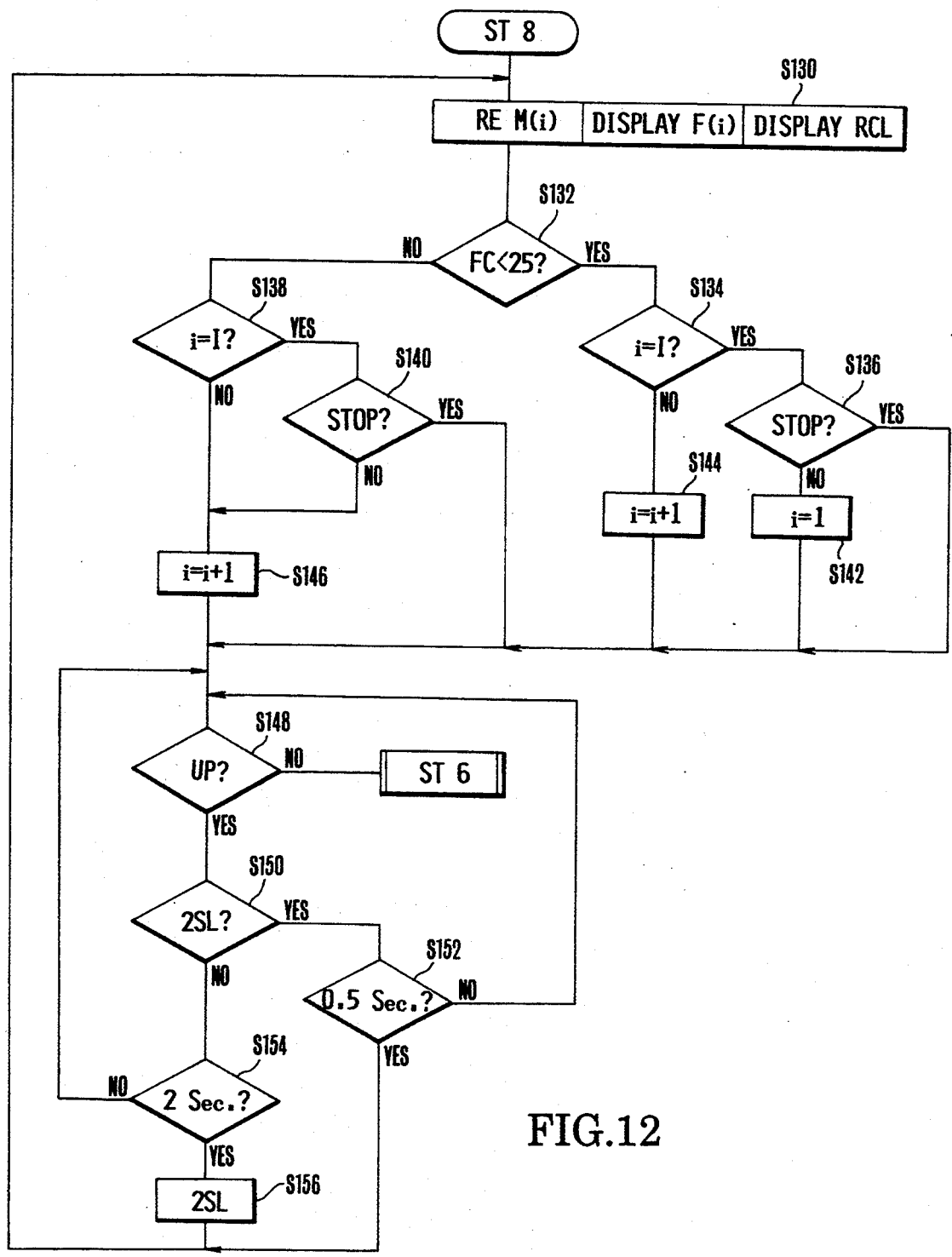

ST 8 (Up display mode for the recall memory 10: FIG. 12)

The status ST 8 starts from the depression of the up button UP in the status ST 6. The flowchart for the status ST 8 is similar to that for the status ST 7. That is, whether or not the number of exposed frames of the silver halide film is larger than "24" or the record capacity of the recall memory 10 has been checked. At the time of start of the status ST 8, the image of the number (i) plus one of the recall memory 10 is displayed. Then, in 2 sec. from the start, and then each time 0.5 sec. passes, the presentation of the images is recycled in the order of ever increasing record numbers of the recall memory 10. The condition for prohibition of the rolling display is similar to that for the status ST 7.

A first step S130 reads the i-th still image from the recall memory 10 to the image display device 18, and displays the value of the recall memory counter F(i) and the mark "RCL" on the counter display device 26. A second step S132 examines whether the value of the frame counter FC is less than 25.

If so, (or where the number of exposed frame of the silver halide film falls within the record capacity of the recall memory 10,) then advance to a step S134, where whether the value of the register i is equal to the value of the register I is determined. If so, then advance is to a step S136. Otherwise, advance is to a step S144. That is, if not equal, then the steps S144 to S148 are executed to increase the record number one by one, while the image of the corresponding number is displayed, until the number becomes equal to the value of the register I.

The step S136 tests the stop switch STP. If ON, then advance is to the step S148. If OFF, then put "1" is set in the register i in a step S142, since the images of the recall memory 10 have been displayed up to the last record number, the representation then returns to the earliest record number or 1. Then advance is to a step S148.

If the step S132 detects that the value of the frame counter FC is 25 or more, (or the number of exposed frames is larger than the record capacity of the recall memory 10, or "24"), then advance is to a step S138, where whether the value of the register i is equal to the value of the register I is determined. If not, (S146 to S148): Because the presentation of the image of the recall memory 10 to the display does not reach the last record number, until it is reached, the record number is increased one by one, while the corresponding image is displayed. And, when i=I becomes, then advance is to a step S140 for testing the stop switch STP. If ON, then advance is directly to a step S148. Thus, the still images of greater record numbers (i) than that in the recall memory 10 are prohibited from being presented to the image display device 18. Meanwhile, if the stop switch STP is determined in the step S140 to be off, such a prohibition does not apply. Then, a step S146 increments the register i by 1. Then advance is to a step S148.

The step S148 tests the up button UP. The subsequent process of steps S150, S152, S154 and S156 is similar to that of the steps S122, S124, S126 and S128 in the status ST 7. So, its explanation is omitted.

Figure 13:
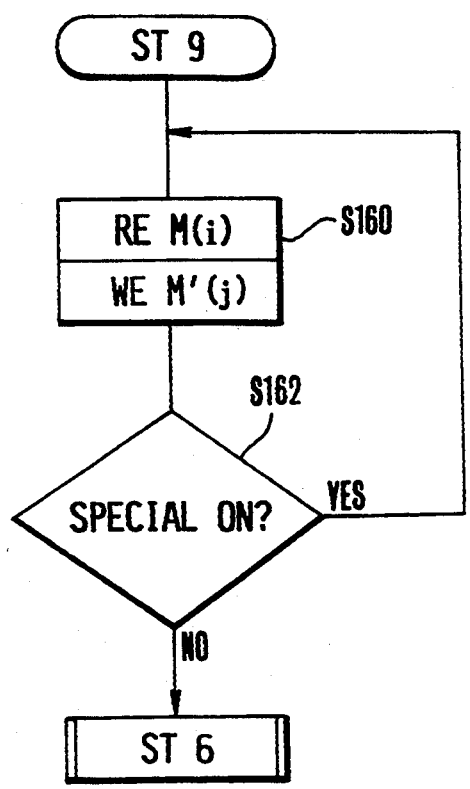

ST 9 (Transfer the recorded images from the recall memory 10 to the special memory 12: FIG. 13)

The procedure starts when the special button SPC is pushed down in the status ST 6 (and through the step S90). A first step S160 reads the i-th recorded image from the recall memory 10 to make a display on the image display device 18, and writes it in the j-th area of the special memory 12.

A second step S162 waits for removal of the operator's finger from the special button SPC. Then advance is to the status ST 6.

Figure 14:
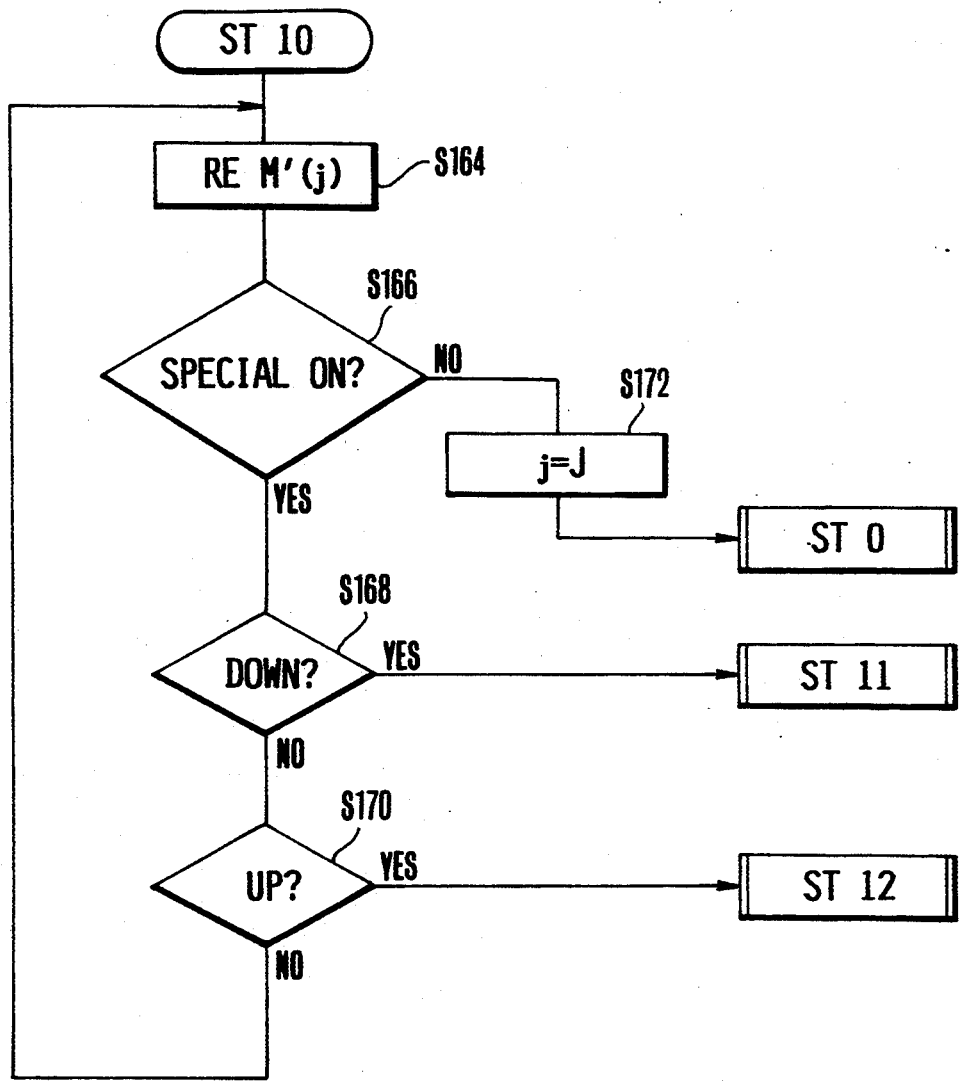

ST 10 (Image reproduction from the special memory 12: FIG. 14)

The procedure starts when the special button SPC is pushed down in the status ST 0 (and through the step S14). A first step S164 reads the j-th recorded image from the special memory 12 to make a display on the image display device 18. A second step S166 tests the special button SPC. If the operator's finger is removed from it, then put the value of the register J, or the number of the last recorded image in the special memory 12, to the registor j in a step S172, thus setting up the status ST 0. (Thereby it is made possible that at the re-start of the status ST 10 from the status ST 0, the recorded image of the last number in the special memory 12 is presented to the image display device 18.)

If the special button SPC is determined in the step S166 to remain pushed down, then advance is to a step S168 for testing the down button DWN. If in depression, then advance is to the status ST 11 (for the down display mode of the special memory 12). Otherwise, advance is to a step S170.

The step S170 tests the up button UP. If in depression, then advance is to the status ST 12 (for the up display mode of the special memory 12). Otherwise, return is to the step S164.

Figure 15:
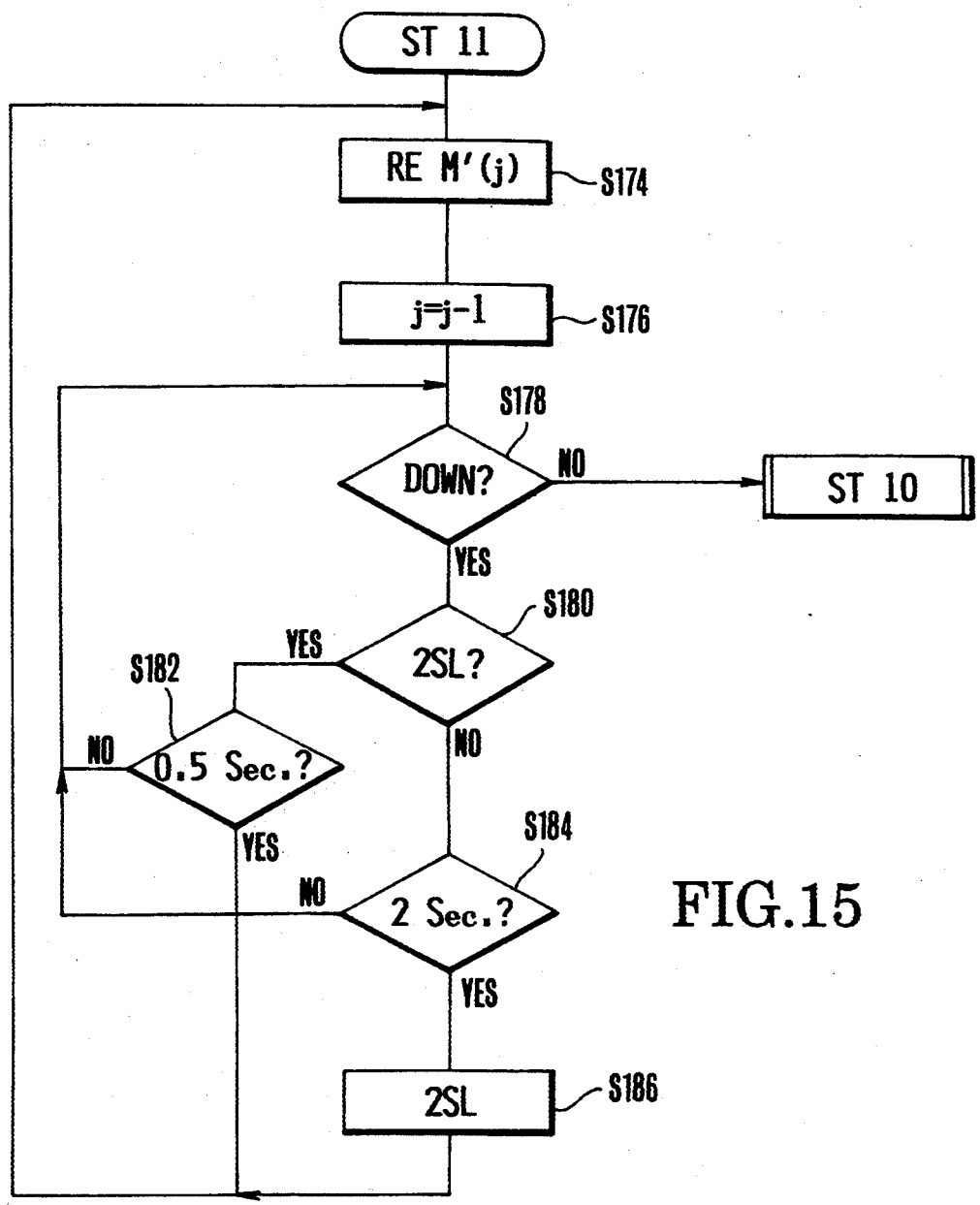

ST 11 (Down display mode of the special memory 12: FIG. 15)

At the time of start, the j-th recorded image of the special memory 12 is presented to the image display device 18 (step S174). Then, the register j is decremented by one (step S176). During pushing down of the down button DWN, at a time when 2 sec. passes from the start of the status ST 11, the image of the one less record number of the special memory 12 appears on the display (:S178→S180→S184→S186→S174. It should be noted that the steps S180, S182, S184 and S186 are the same as the steps S122 to S128 of the status ST 7). Then advance is to a step S176 followed by a step S178. Therefore, so long as the down button DWN is pushed down, the recorded images of the special memory 12 appear in the down mode on the display successively in periods of 0.5 sec.(:S180→S182→S174). (Thus, rolling display takes place.)

If the down button DWN is released from the depression, then return to the status ST 10 (:step S178.)

Figure 16:
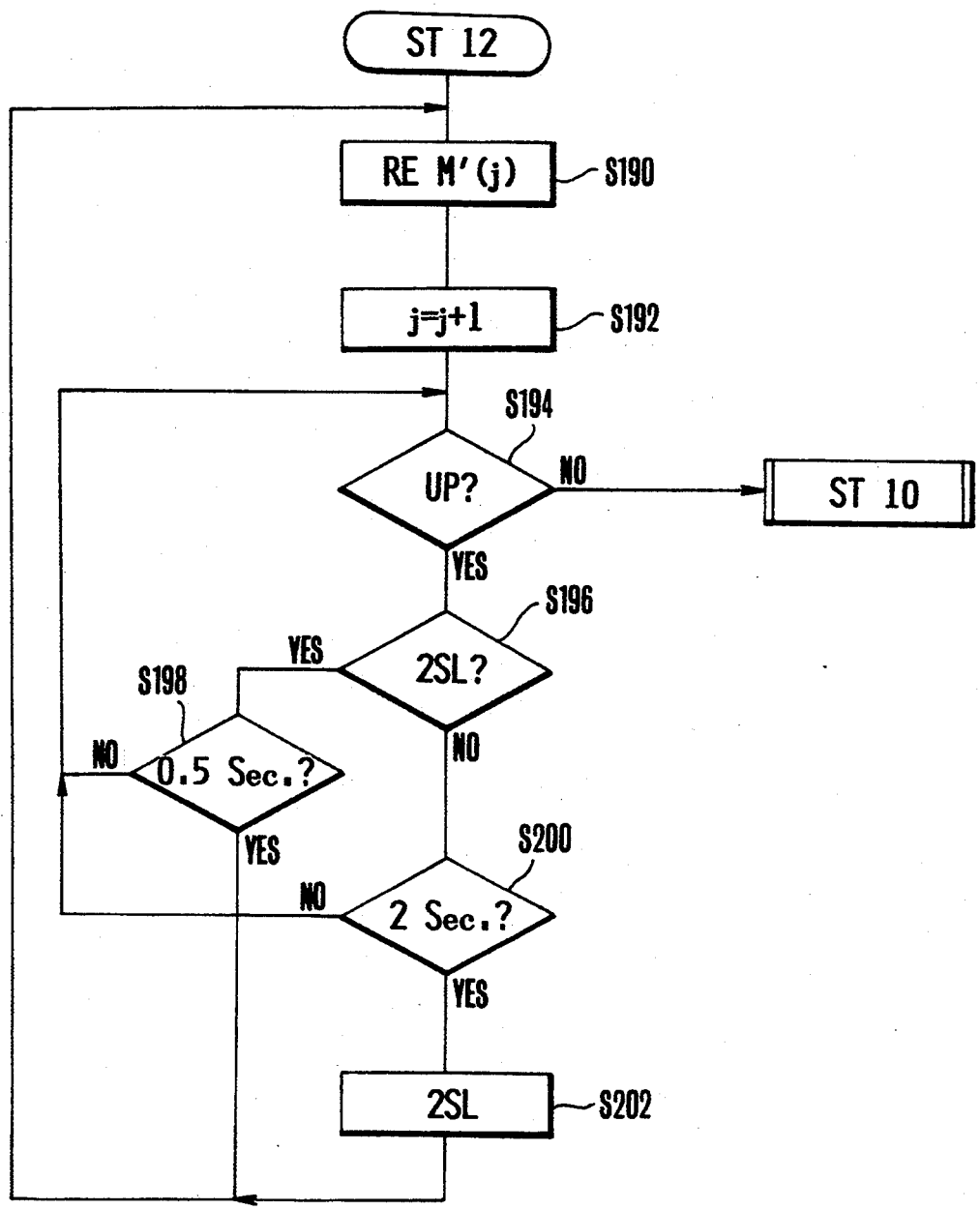

ST 12 (Up display mode of the special memory 12: FIG. 16)

Here, at the time of start, the j-th recorded image of the special memory 12 is presented to the image display device 18 (: step S190). Then the register j is incremented by one (: step S192). Then the up button UP is tested. The subsequent procedure is similar to that of the status ST 11. Therefore, so long as the up button UP is pushed down, the recorded images of the special memory 12 appear endlessly in the up mode on the display first in 2 sec. from the start and then in each period of 0.5 sec. (: S194, S196, S198, S200, S202). If the up button UP is released from the depression, then return to the status ST 10 (: step S194).

Figure 17:
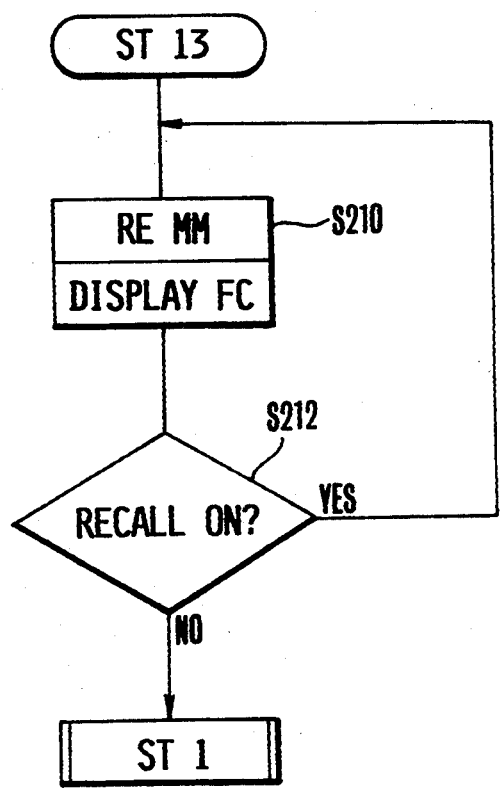

ST 13 (Still image display of an object image (moving image): FIG. 17)

The procedure starts from the depression of the recall button RCL in the status ST 1. A first step S210 reads the moving image from the memory 8 to the image display device 18 and at the same time displays the value of the frame counter FC on the counter display device 26. It should be noted that since the information of the moving image is stopped from being written in the moving image memory 8 at the time of start of the status ST 13, that image which has been stored in the moving image memory 8 just before that start appears on the image display device 18.

Then the release of the recall button RCL from the is. Then return is to the status ST 1.

Figure 18:
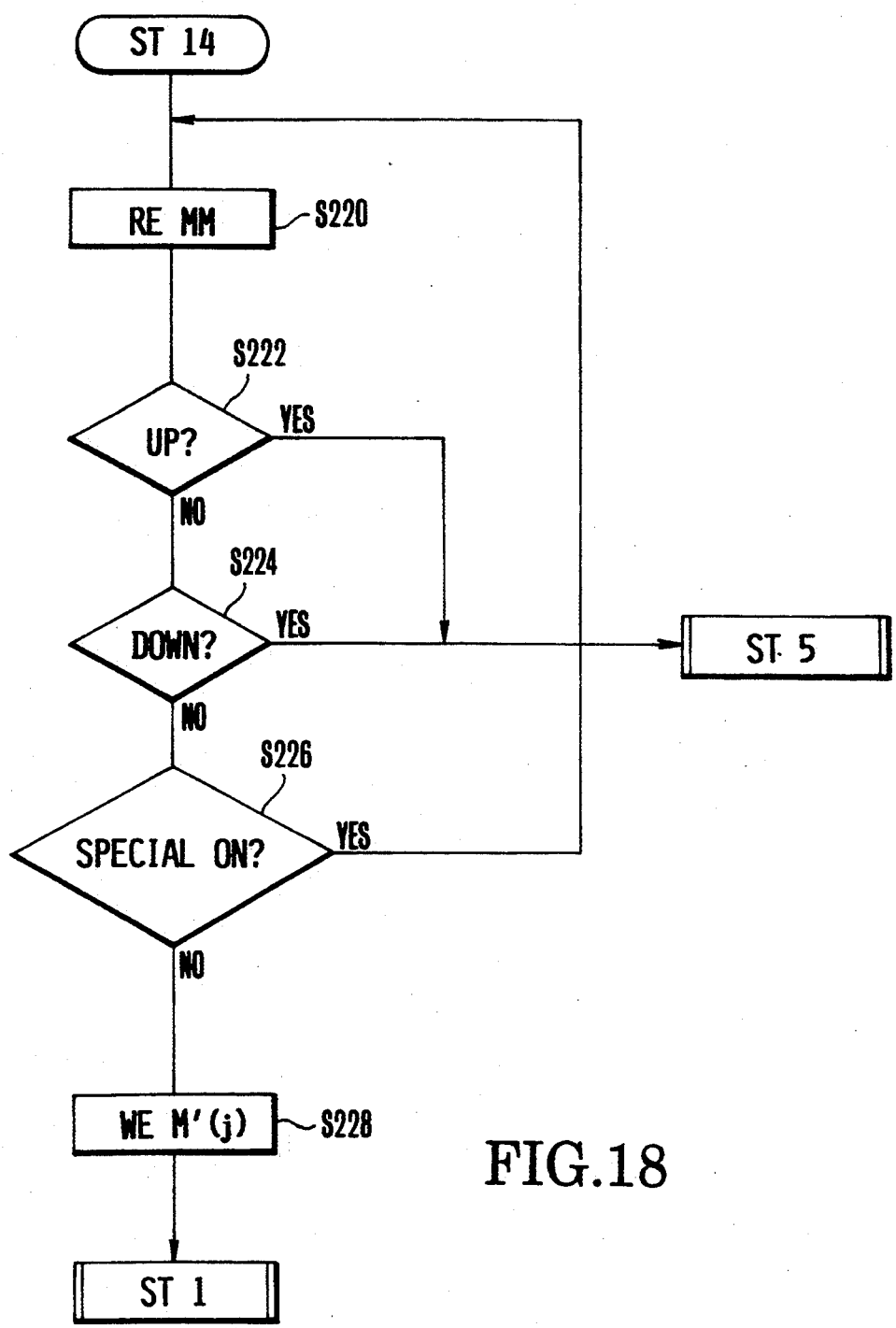

ST 14 (Record object image in the special memory 12: FIG. 18)

The depression of the special button SPC in the status ST 1 leads to the status ST 14. If, here, the special button SPC is released, the still image in the moving image memory 8 is then read and recorded in the special memory 12.

That is, a first step S220 reads the image from the moving image memory 8 to make a display on the image display device 18, (since, at the time of start of the status ST 14, the moving image memory 8 stops from writing in). A second step S222 tests the up button UP. If in depression, then advance is to the status ST 5. Otherwise, advance is to a step S224, where the down button DWN is tested. If in depression, then advance is to the status ST 5. Otherwise, advance is to a step S226.

The step S226 waits for the release of the special button SPC from the depression. In response to its release, a step S228 reads the record content (still image) of the moving image memory 8 and records it in the j-th area of the special memory 12. (Since the advance from the status ST 1 to the status ST 14 occurs through the step S40 (j=j+1), because the j-th area of the special memory 12 is prepared for recording of a new still image, the image to be recorded is brought thereto.) Then return is to the status ST 1.

Figure 19:
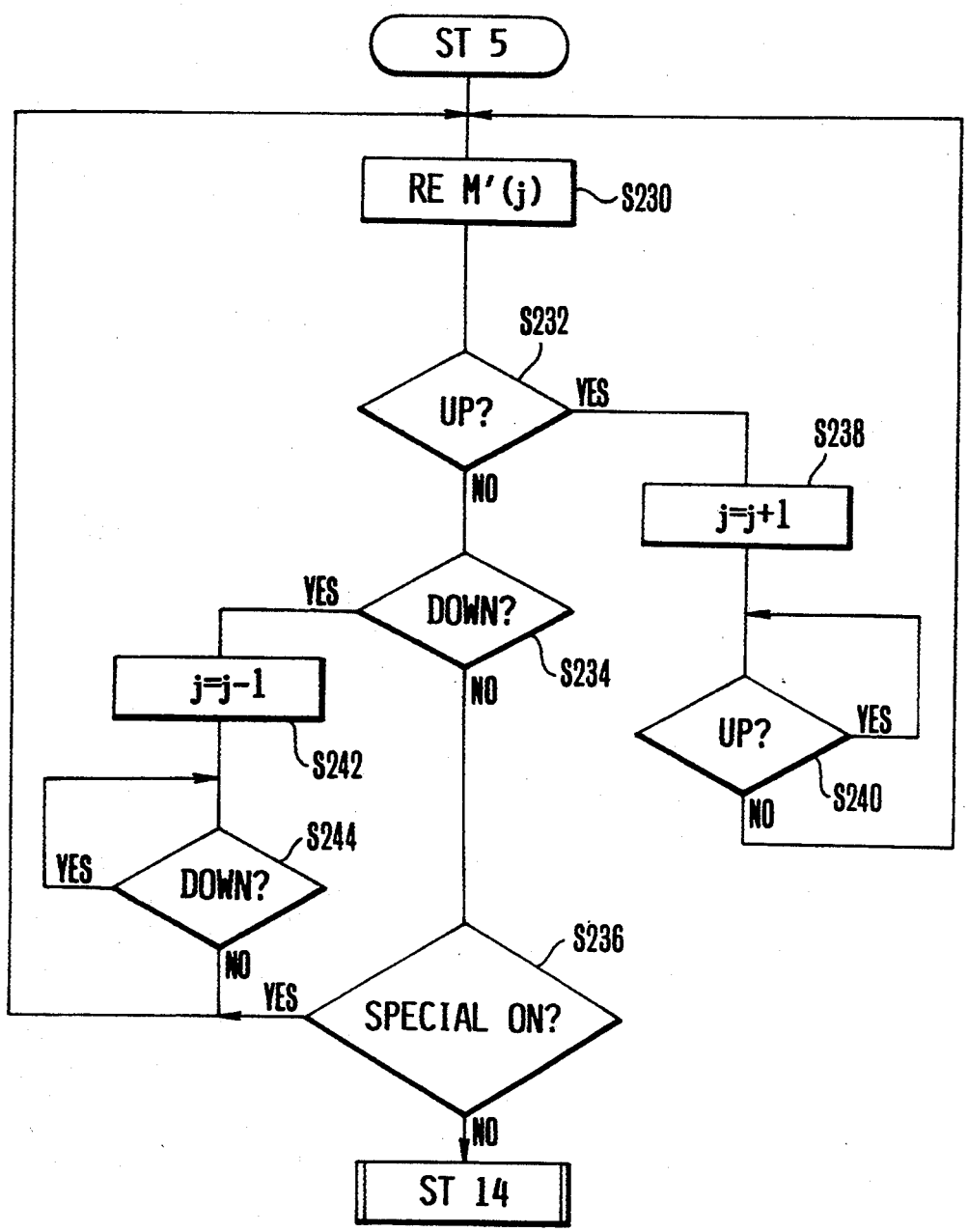

ST 5 (Selection of image to be rewritten in the special memory 12: FIG. 19)

Here, the user chooses a record number for the image desired to be rewritten of the special memory 12.

The procedure starts when the up button UP or the down button DWN is pushed down in the status ST 14. As the number of times the depression of the up button UP or the down button DWN has been repeated increases, the record number of the special memory 12 is increased or decreased. After the desired value of the record number for the image to be rewritten has been sought out, the user removes his finger from the special button SPC, thus returning to the status ST 14. A first step S230 reads the j-th recorded image of the special memory 12 and displays it in blinking form on the image display device 18. Then advance is to a step S232.

The step S232 tests the up button UP. If in depression, a step S238 then increments the register j by one. Then, a step S240 waits for the release of the up button UP from the depression. Then the flow passes through a step S230 to return to the step S232. Thereby, the record number for the image desired to be rewritten of the special memory 12 is increased by 1, and the corresponding image to the increased record number appears in blinking form on the display. Therefore, by the number of times the depression of the up button UP has been repeated, the image of a higher record number of the special memory 12 than the starting one can be displayed.

If, in the step S232, the up button UP is not pushed down, then advance is to a step S234, where the down button DWN is tested. Subsequently, similar to the case of the up button UP, by the number of times the depression of the down button DWN has been repeated (: S234, S242, S244, S230), the image of a lower record number than the starting one of the special memory 12 can be displayed in a blinking form.

If, in the step S234, the down button DWN is not pushed down, then advance is to a step S236, where the special button SPC is tested. If in depression, then return is to the step S230. Otherwise, return is to the status ST 14. (Then, in the status ST 14, if any of the buttons UP, DWN and SPC is not pushed down, the image of that record number which has last appeared on the image display device 18 when in the status ST 5, is rewritten by the still image of the moving image memory 8.)

Figure 20:
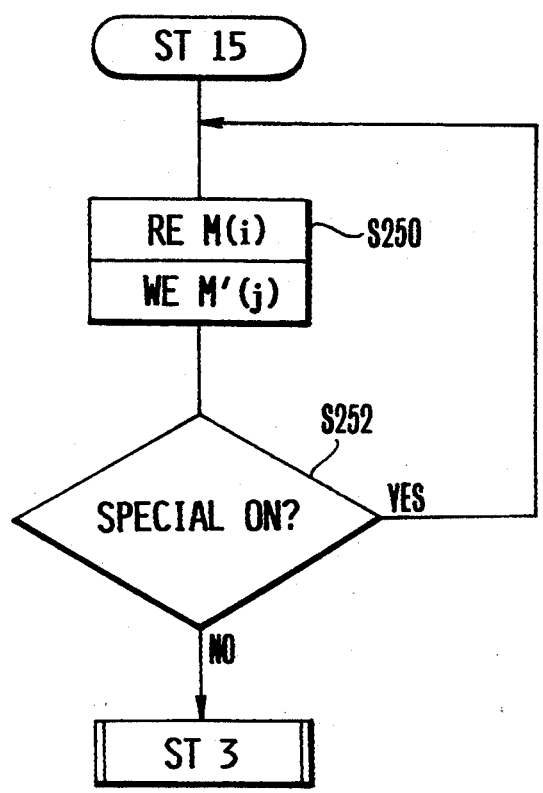

ST 15 (Record a still image of the recall memory 10 in the special memory 12: FIG. 20)

The procedure starts when the special button SPC is pushed down in the status ST 3. A first step S250 reads the i-th recorded image from the recall memory 10 to make a display on the image display device 18, and then writes it in the j-th area of the special memory 12. A second step S252 waits for the release of the special button SPC from the depression. Then return is to the status ST 3. Thereby the still image recorded in the recall memory 10 at the time of the camera release can be saved for later special purposes in the special memory 12.

What is claimed is:

1. A camera comprising:
   (A) display means for displaying image information, said display means selectively displaying moving image information or still image information;
   (B) first memory means for storing the moving image information to be supplied to the display means;
   (C) second memory means for storing the still image information to be supplied to the display means;
   (D) mode setting means for setting a mode; and
   (E) memory control means for causing the first and second memory means to vary their operation according to combination of the mode set by the mode setting means with operation of common operation means.

2. A camera according to claim 1, wherein said display means includes means for inputting present image information as said moving image information.

3. A camera according to claim 1, wherein said display means includes means for memorizing said still information.

4. A device for outputting an image signal stored in a memory, comprising:
   (A) first memory means for storing the image signal,
   (B) second memory means for storing the image signal,
   (C) mode setting means for setting at least a first mode and a second mode,
   (D) indication means, and
   (E) control means for controlling operation of said first and second memory means according to said first or second mode or combination of first and second mode with operation of said indication means.

5. A device according to claim 4 wherein said control means causes read-out of the image signal from the second memory means when the indication means is operated in the first mode, causes read-out of the image signal from the first memory means through the second memory means when the indication means is operated in the second mode, and causes read-out of the image signal from the first memory means when the first mode is shifting to the second mode.

6. A camera comprising:
   (A) display means for displaying image information, said display means selectively displaying moving image information and still image information; and
   (B) common operating means, when the moving image information is displayed on said display means, working as means for varying a focal length of said camera, and, when the still image information is displayed on said display means, working as means for changing the still image information displayed on said display means to another still image information.

7. A camera according to claim 6, wherein said display means includes means for inputting present image information as said moving image information.

8. A camera according to claim 6, wherein said display means includes means for memorizing said still information.

* * * * *

UNITED STATES PATENT AND TRADEMARK OFFICE
CERTIFICATE OF CORRECTION

PATENT NO. : 5,416,560
DATED : May 16, 1995          Page 1 of 3
INVENTOR(S) : Hideo Taka It is certified that error appears in the above-indentified patent and that said Letters Patent is hereby corrected as shown below:

Title page, item [54] and Col. 1, line 2, after "CAMERA" insert --HAVING COMMON BUTTON FOR DIFFERENT FUNCTIONING FOR STILL AND MOVING IMAGES --.

Col. 1, line 24.   After "down" insert -- , --.

Col. 1, line 36.   After "kind" insert -- , --.

Col. 1, line 45.   After "memory" insert -- , --.

Col. 2, line 3.    Change "which" to -- one on the other --.

Col. 2, line 39.   Delete "second".

Col. 2, line 47.   Delete "provided".

Col. 2, line 57.   Change "Dead" to -- read --.

Col. 2, line 46.   Change "&till" to -- still --.

Col. 4, line 1.    Before "display" insert -- A --.

Col. 4, line 4.    Change "2dimen-" to -- 2-dimen- --.

Col. 4, line 19.   After "Fig. 2" insert -- display device 18 unitarily arranged therewith --.

Col. 4, line 47.   Change ".this" to -- this --.

Col. 6, line 32.   Change "sill" to -- still --.

Col. 7, line 19.   Change "combine" to -- combined --.

UNITED STATES PATENT AND TRADEMARK OFFICE
CERTIFICATE OF CORRECTION

PATENT NO. : 5,416,560
DATED : May 16, 1995
INVENTOR(S) : Hiedo Taka

It is certified that error appears in the above-indentified patent and that said Letters Patent is hereby corrected as shown below:

```
Col. 7, line 38.   Change "there from" to -- therefrom --.
Col. 7, line 39.   Change "Shooting" to -- shooting --.
Col. 8, line 60.   After "of" insert -- the --.
Col. 8, line 63.   Change "b," to -- 10, --.
Col. 9, line 25.   Delete "about".
Col. 9, line 42.   Change "repeat" to -- repeats --.
Col. 10, line 63.  Delete "is tested".
Col. 10, line 66.  Change "set" to -- setting --.
Col. 10, line 68.  Change "advance" to -- advances --.
Col. 11, line 15.  After "return" insert -- is --.
Col. 11, line 20.  After "return" insert -- is --.
Col. 11, line 43.  After "as" insert -- the --.
Col. 11, line 52.  After "is" insert -- incremented --.
Col. 11, line 64.  After "advance" insert -- is --.
Col. 11, line 68.  Change "(that" to -- that --.
Col. 12, line 2.   Change "Order" to -- order --.
```

UNITED STATES PATENT AND TRADEMARK OFFICE
CERTIFICATE OF CORRECTION

PATENT NO.   : 5,416,560
DATED        : May 16, 1995
INVENTOR(S)  : Hiedo Taka

It is certified that error appears in the above-indentified patent and that said Letters Patent is hereby corrected as shown below:

Col. 12, line 3.   Change "i)." to -- i. --.

Col. 12, line 28.  Delete "the".

Col. 12, line 50.  After "advance" insert -- is --.

Col. 12, line 51.  After "advance" insert -- is --.

Col. 12, line 63.  After "advance" insert -- is --.

Col. 14, line 37.  Delete "put".

Col. 15, line 19.  Change "registor" to -- register --.

Col. 16, line 14.  Change "the is." to -- the depression is awaited --.

Signed and Sealed this

Twenty-eighth Day of November 1995

Attest:

BRUCE LEHMAN

*Attesting Officer*   *Commissioner of Patents and Trademarks*